US012192296B2

(12) United States Patent
Naik et al.

(10) Patent No.: US 12,192,296 B2
(45) Date of Patent: Jan. 7, 2025

(54) METHOD AND APPARATUS FOR OPERATING DEVICES IN IOT ENVIRONMENT

(71) Applicant: Samsung Electronics Co., Ltd., Suwon-si (KR)

(72) Inventors: Sulochan Naik, Bangalore (IN); Ankush Kapoor, Bangalore (IN); Srinivas Rao Elchuri, Bangalore (IN); Anuj Yogendra Arora, Bangalore (IN); Hardik Singla, Bangalore (IN); Kushal Kanti Ghosh, Bangalore (IN); Pranay Samrit, Bangalore (IN); Sachin Jain, Bangalore (IN); Tilak Yogeshkumar Patel, Bangalore (IN); Vivek Kumar Ammanahatti Narayana, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 17/668,857

(22) Filed: Feb. 10, 2022

(65) Prior Publication Data
US 2023/0164230 A1 May 25, 2023

Related U.S. Application Data

(63) Continuation of application No. PCT/KR2022/001367, filed on Jan. 26, 2022.

(30) Foreign Application Priority Data

Nov. 19, 2021 (IN) .............................. 202141053389

(51) Int. Cl.
*H04L 67/52* (2022.01)
*H04L 67/12* (2022.01)
*H04W 4/02* (2018.01)

(52) U.S. Cl.
CPC .............. *H04L 67/52* (2022.05); *H04L 67/12* (2013.01); *H04W 4/023* (2013.01); *H04W 4/025* (2013.01)

(58) Field of Classification Search
CPC ..................................................... H04L 67/535
(Continued)

(56) References Cited

U.S. PATENT DOCUMENTS 8,301,158 B1 * 10/2012 Thomas ................ H04W 12/06
455/414.2
9,349,179 B2 * 5/2016 Acharya .............. G06V 20/647
(Continued)

FOREIGN PATENT DOCUMENTS

| CN | 109564579 A | 4/2019 |
| KR | 10-2020-0107639 A | 9/2020 |
| WO | 2017/218437 A1 | 12/2017 |

OTHER PUBLICATIONS

International Search Report and Written Opinion dated Aug. 9, 2022, issued in International Patent Application No. PCT/KR2022/001367.

(Continued)

*Primary Examiner* — Qutbuddin Ghulamali
(74) *Attorney, Agent, or Firm* — Jefferson IP Law, LLP

(57) ABSTRACT

A method for operating devices by an electronic device in an Internet of Things (IoT) environment is provided. The method includes monitoring a movement of at least one object from a first location to a second location, identifying a relative position of the at least one object in the second location with respect to at least one entity, predicting an initiation of at least one activity by the at least one entity, based on the determined relative position of the at least one object with respect to the at least one entity, and modifying (Continued)

an operational state of at least one device associated with the predicted at least one activity.

18 Claims, 31 Drawing Sheets

(58) Field of Classification Search
 USPC .......................................................... 455/460
 See application file for complete search history.

(56) References Cited

U.S. PATENT DOCUMENTS

| | | | | |
|---|---|---|---|---|
| 10,051,068 | B2* | 8/2018 | Sharma | H04W 4/70 |
| 10,171,586 | B2* | 1/2019 | Shaashua | H04W 4/023 |
| 11,727,085 | B2* | 8/2023 | Samal | G16Y 40/30 |
| | | | | 709/223 |
| 2005/0026596 | A1* | 2/2005 | Markovitz | G06Q 20/00 |
| | | | | 455/411 |
| 2015/0019553 | A1* | 1/2015 | Shaashua | G06N 5/04 |
| | | | | 707/737 |
| 2017/0093982 | A1 | 3/2017 | Shaashua et al. | |
| 2018/0288161 | A1 | 10/2018 | Saxena et al. | |
| 2019/0116449 | A1* | 4/2019 | Norris | H04S 7/304 |
| 2020/0094398 | A1* | 3/2020 | Young | B25J 11/008 |
| 2021/0176317 | A1* | 6/2021 | Yeoh | G06F 40/20 |
| 2021/0350279 | A1* | 11/2021 | Shaashua | G06F 16/35 |

OTHER PUBLICATIONS

Klavestad et al., "Monitoring Activities of Daily Living Using UWB Radar Technology: A Contactless Approach", Sep. 30, 2020.
Du et al., "Activity Prediction Using LSTM in Smart Home", 2019.
Indian Office Action dated Sep. 26, 2023, issued in Indian Patent Application No. 202141053389.
Extended European Search Report dated Aug. 19, 2024, issued in European Application No. 22895747.8-1215.

* cited by examiner

METHOD AND APPARATUS FOR OPERATING DEVICES IN IOT ENVIRONMENT

CROSS-REFERENCE TO RELATED APPLICATION(S)

This application is a continuation application, claiming priority under § 365(c), of an International application No. PCT/KR2022/001367 filed on Jan. 26, 2022, which is based on and claims the benefit of an Indian Complete patent application number 202141053389, filed on Nov. 19, 2021, in the Indian Patent Office, the disclosure of which is incorporated by reference herein in its entirety.

BACKGROUND

1. Field

The disclosure relates to the field of an Internet of Things (IoT) environment. More particularly, the disclosure relates to operating devices in an IoT environment based on change in a relative position of one or more objects with respect to one or more entities.

2. Description of Related Art

In general, an Internet of Things (IoT) environment includes a plurality of IoT devices with which users may interact and control their operations. Also, an operational state of the IoT devices may be controlled automatically for enhancing a user experience. In existing methods, the operational state of the IoT devices may be controlled based on at least one of, but is not limited to, time, a location, a status of the IoT devices, security related aspects, a routine, a user personalized inputs, and so on (as depicted in FIG. 1A). However, whenever a user wants to perform one or more activities associated with a change in a relative position of one or more objects, the existing methods do not involve controlling/modifying the operational state of the IoT devices based on the change in the relative position of the one or more objects associated with the one or more IoT devices. Thus, the user has to perform the one or more activities by manually operating the IoT devices, which become cumbersome for the user to repeat the activities manually every time.

Consider an example scenario, as depicted in FIG. 1B, wherein the user picks up clothes and detergent liquid for washing. In such a scenario, the user wants an automated solution to turn ON a washer for washing the clothes instead of manually turning ON the washer. However, the existing methods do not provide the automated solution to turn ON the washer when there is a change in a relative position of the clothes and the detergent liquid with respect to the user.

Consider another example scenario, as depicted in FIG. 1C, wherein the user performs workout daily using a yoga mat and a yoga ball. In such a scenario, the user wants an automated solution to turn ON a television (TV) and an air purifier every time instead of manually turning ON the TV and the air purifier. However, the existing methods do not provide the automated solution to turn ON the TV and the air purifier based on an interaction of the user with the yoga mat and the yoga ball. Thus, manually turning ON the TV and the air purifier every time while performing the workout may become cumbersome for the user.

Consider another example scenario, as depicted in FIG. 1D, wherein the user wants an automated solution to turn ON a geyser and a tap whenever the user picks up a towel, instead of manually turning ON the geyser and the tap. However, the existing methods do not provide the automated solution to turn ON the geyser and the tap based on a change in a relative position of the towel with respect to the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for operating Internet of Things (IoT) devices in an IoT environment.

Another aspect of the disclose is to provide methods and systems for predicting an initiation of one or more activities by one or more entities based on a change in a relative position of one or more objects with respect to the one or more entities and modifying an operational state of the one or more IoT devices associated with the predicted one or more activities.

Another aspect of the disclose is to provide methods and systems for determining an intensity of the one or more activities being performed by the one or more entities and tuning the operational state of the one or more IoT devices associated with the one or more activities based on the determined intensity of the one or more activities.

Additional aspects will be set forth in part in the description which follows and, in part, will be apparent from the description, or may be learned by practice of the presented embodiments.

In accordance with an aspect of the disclosure, a method for operating devices by an electronic device in an Inter of Things (IoT) environment is provided. The method includes monitoring a movement of at least one object from a first location to a second location, identifying a relative position of the at least one object in the second location with respect to at least one entity, predicting an initiation of at least one activity by the at least one entity, based on the determined relative position of the at least one object with respect to the at least one entity, and modifying an operational state of at least one device associated with the predicted at least one activity.

In accordance with another aspect of the disclosure, an electronic device for operating devices in an Internet of Things (IoT) environment is provided. The electronic device includes a memory, and a controller coupled to the memory and configured to, monitor a movement of at least one object from a first location to a second location, identify a relative position of the at least one object in the second location with respect to at least one entity, predict an initiation of at least one activity by the at least one entity, based on the determined relative position of the at least one object with respect to the at least one entity, and modify an operational state of at least one device associated with the predicted at least one activity.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
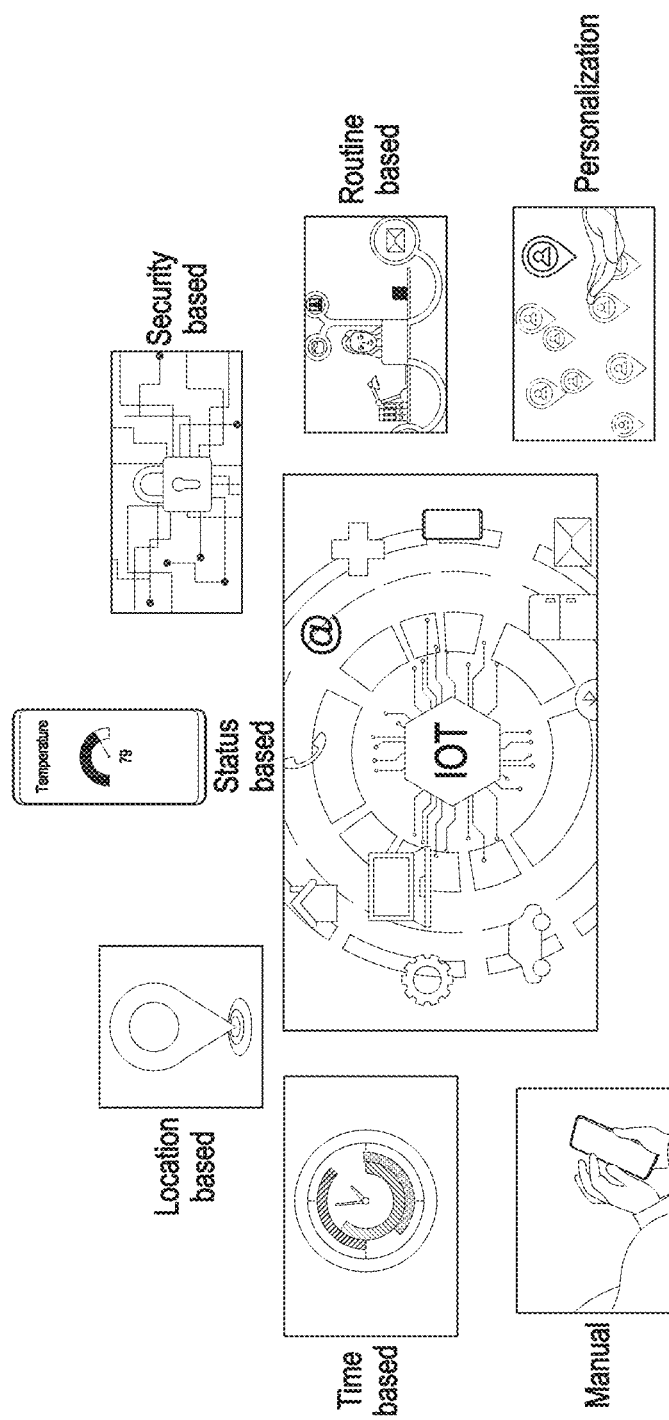
FIGS. 1A, 1B, 1C, and 1D depict example use cases of operating Internet of Things (IoT) using existing methods according to the related arts.
Figure 1B:
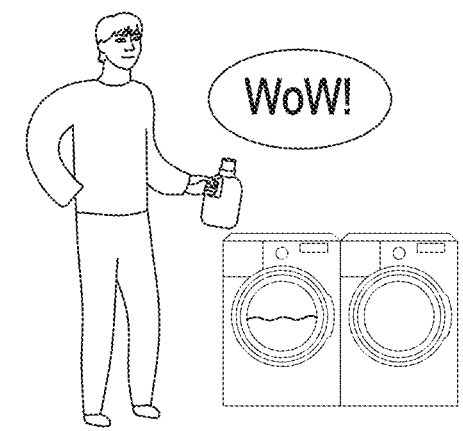
Figure 1C:
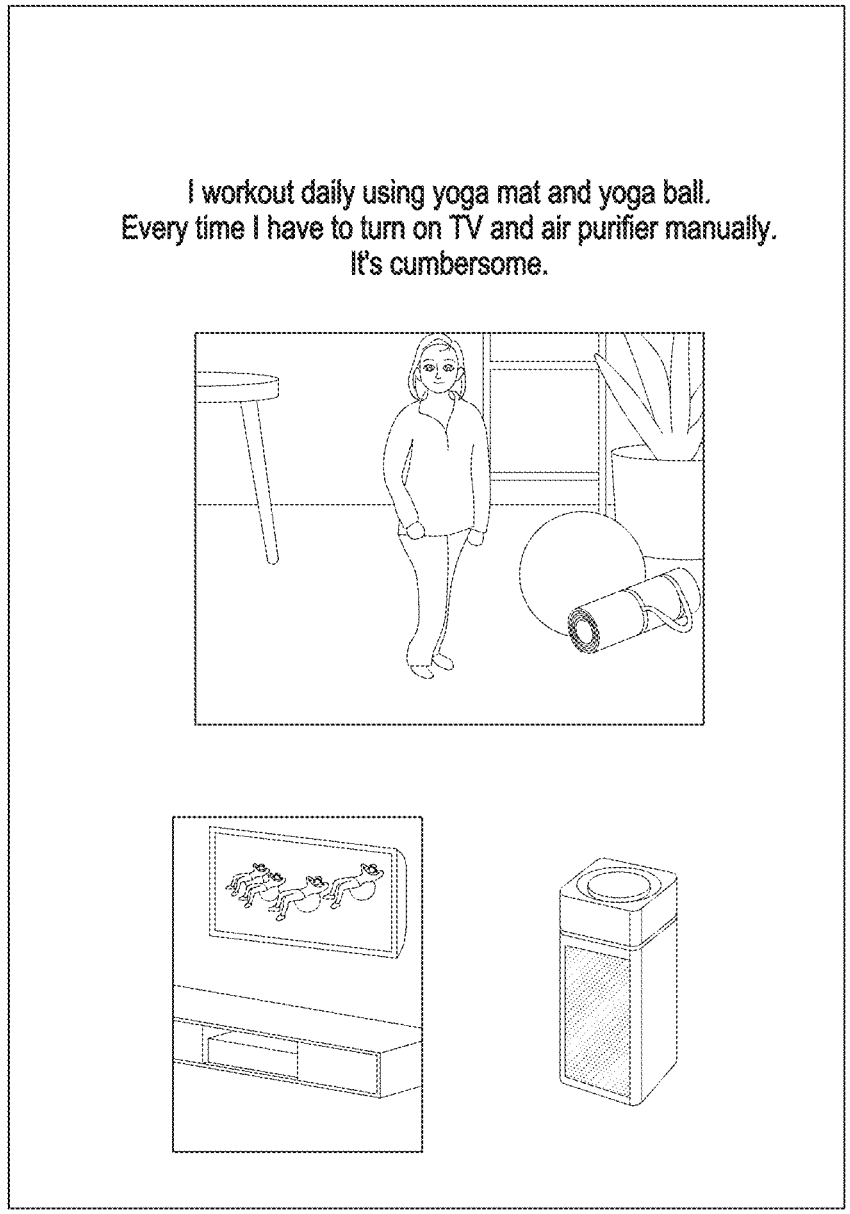
Figure 1D:
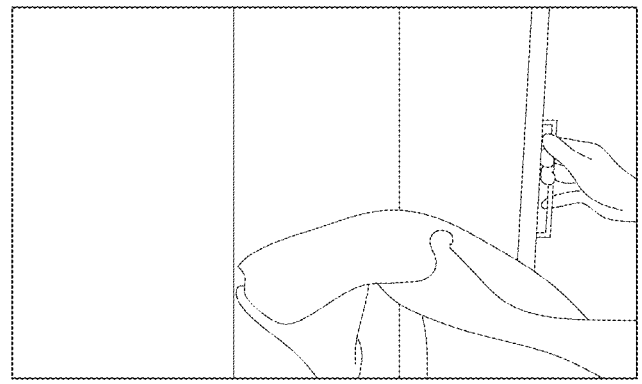
Figure 1D:
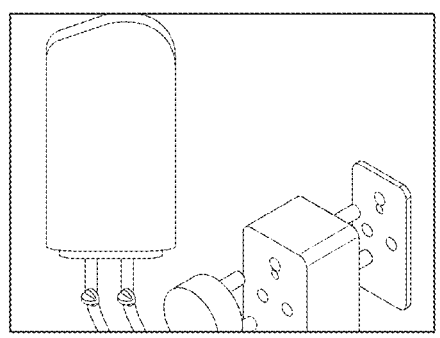
Figure 1D:
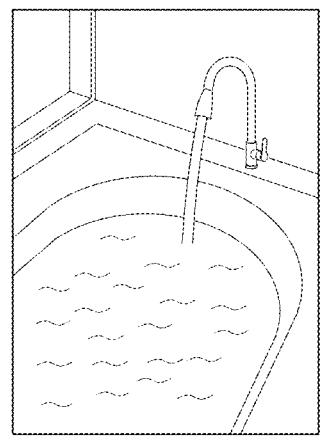

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for operating Internet of Things (IoT) devices in an IoT environment based on a change in a relative position of one or more objects with respect to one or more entities.

Referring now to the drawings, and more particularly to FIGS. 2, 3, 4, 5A, 5B, 6, 7, 8, 9, 10A to 10D, 11, 12A, 12B, 13A, 13B, 14, 15A, 15B, 16A, 16B, 17A, 17B, 18, 19, and 20, where similar reference characters denote corresponding features consistently throughout the figures, there are shown example embodiments.

Figure 2:
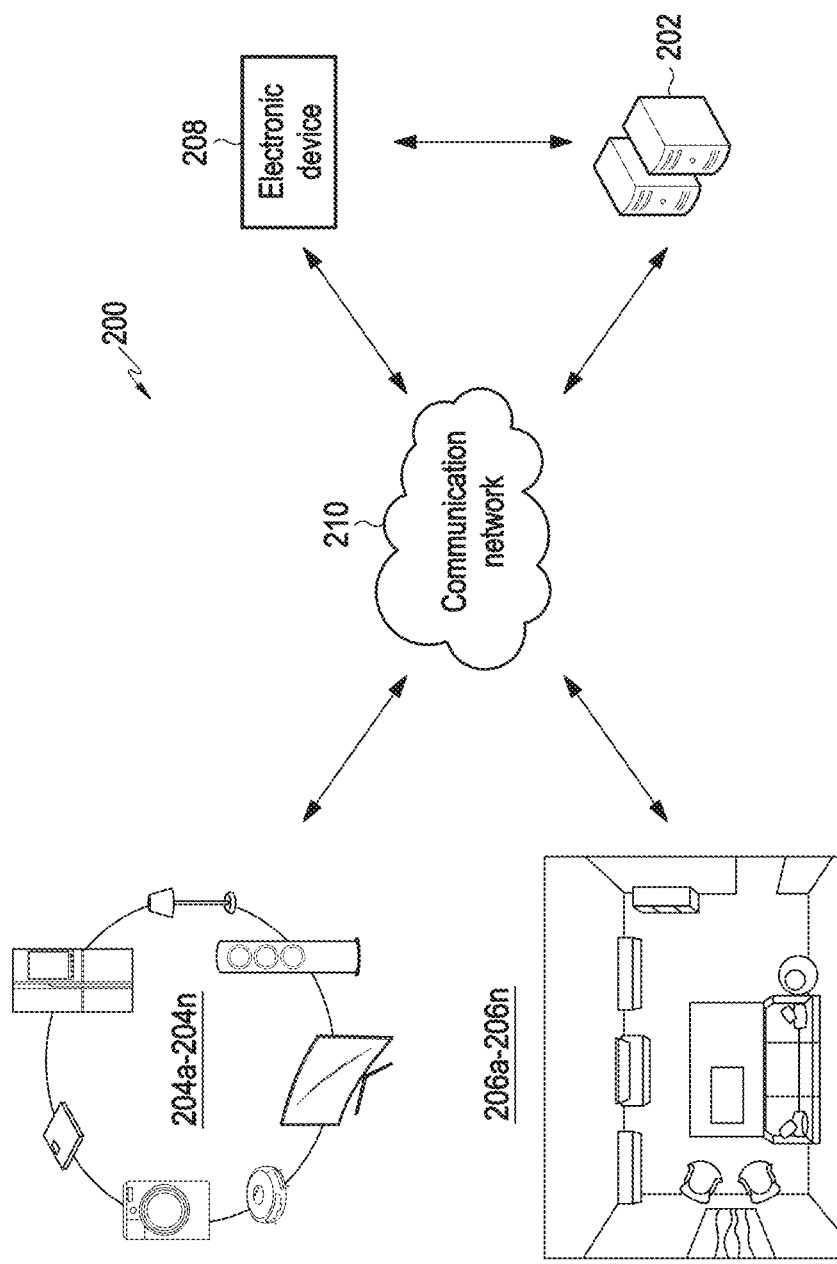
FIG. 2 depicts an Internet of Things (IoT) system, according to an embodiment of the disclosure.

FIG. 2 depicts an Internet of Things (IoT) system, according to an embodiment of the disclosure. The IoT system 200 includes an IoT cloud server 202, a plurality of IoT devices 204a-204n, a plurality of objects 206a-206n, and an electronic device 208.

Referring to FIG. 2, an IoT cloud server 202, a plurality of IoT devices 204a-204n, and an electronic device 208 may be connected with each other. In an example, the IoT cloud server 202, the plurality of IoT devices 204a-204n, and the electronic device 208 may be connected with each other using a communication network 210. The communication network 210 may include at least one of, but is not limited to, a wired network, a value added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (e.g., wireless fidelity (Wi-Fi)), Bluetooth, Bluetooth low energy, Zigbee, Wi-Fi Direct (WFD), Ultra-wideband (UWB), infrared data association (IrDA), near field communication (NFC), and so on. In another example, the electronic device 208, and the plurality of IoT devices 204a-204n may be connected with each other directly (for example: via a direct communication, via an access point, and so on). In another example, the electronic device 208 and the plurality of IoT devices 204a-204n may be connected to the IoT cloud server 202 and the electronic device 208 may be connected to the plurality of IoT devices 204a-204n through the IoT cloud server 202. In another example, the electronic device 208 may be connected to the plurality of IoT devices 204a-204n using the communication network 210 and the electronic device 208 and the plurality of IoT devices 204a-204n may be connected to the IoT cloud server 202 using the communication network 210. In another example, IoT cloud server 202, the plurality of IoT devices 204a-204n, and the electronic device 208 may be connected with each other via a relay, a hub, and a gateway. It is understood that the IoT cloud server 202, the plurality of IoT devices 204a-204n, and the electronic device 208 may be connected to each other in any of various manners (including those described above) and may be connected to each other in two or more of various manners (including those described above) at the same time.

The IoT cloud server 202 referred herein may be configured as a hardware device independent of the electronic device 208 but is not limited thereto. The IoT cloud server 202 may be a component of the electronic device 208 or may be a server designed to be classified into software.

The IoT cloud server 202 referred herein may be a server that obtains, stores, and manages device information, capabilities, location information, and an operational state of each of the plurality of IoT devices 204a-204n present in an IoT environment. Examples of the IoT environment may be, but are not limited to, a smart home environment, a smart office environment, a smart hospital environment, and so on. The device information may include information such as, but is not limited to, an identification value (for example: device ID information) of each of the plurality of IoT devices 204a-204n, a device type of each of the plurality of IoT devices 204a-204n, and so on. In an example herein, the identification value/device ID information may include information such as, but are not limited to, a Media Access Control (MAC) identifier (MAC ID), a serial number, a unique device ID, and so on. The capabilities include information about one or more capabilities of each of the plurality of IoT devices 204a-204n. Examples of the capabilities of the IoT device (204a-204n) may be, but are not limited to, an audio, a video, a display, an energy limit, data sensing capability, and so on. The location information includes information about a location of each of the plurality of IoT devices 204a-204n. The location of the IoT device (204a-204n) may indicate an area or a room (for example: a living room, a kitchen, a bedroom, a study room, a child room, a ward, a conference room, a factory unit, and so on) in the IoT environment, where the IoT device (204a-204n) is present. The operational state of the IoT device (204a-204n) provides information about at least one of, but is not limited to, a power ON/OFF state, an operation being performed by each of the plurality of IoT devices 204a-204n, and so on. Examples of the operation may be, but are not limited to, audio casting, video casting, controlling lights, energy managing, purifying air, sensing environmental factors (such as temperature humidity, smoke, or the like), and so on. The IoT cloud server 202 may update the device information, the capabilities, and the location information, on adding or removing any of the plurality of IoT devices 204a-204n in the IoT environment. The IoT cloud server 202 may also update the operational state of the IoT devices 204a-204n. In an example, the IoT cloud server 202 may update the operational state of the IoT devices 204a-204n continuously. In another example, the IoT cloud server 202 may update the operational state of the IoT devices 204a-204n at periodic intervals. In another example, the IoT cloud server 202 may update the operational state of the IoT devices 204a-204n on occurrence of at least one event. In an example, the event may include turn ON/OFF of the IoT devices 204a-204n.

The plurality of IoT devices 204a-204n may be devices capable of exchanging information with each other and other devices (such as, the IoT cloud server 202, the electronic device 208, or the like). The plurality of IoT devices 204a-204n may be deployed in various locations or areas or rooms in the IoT environment with which users may interact and control the operations of each IoT device (204a-204n).

Examples of the plurality of IoT devices 204a-204n may be, but are not limited to, a smart phone, a mobile phone, a video phone, a computer, a tablet personal computer (PC), a netbook computer, a laptop, a wearable device, a vehicle infotainment system, a workstation, a server, a personal digital assistant (PDA), a smart plug, a portable multimedia player (PMP), a moving picture experts group phase 1 or phase 2 (MPEG-1 or MPEG-2) audio layer-3 (MP3) layer, a mobile medical device, a light, a voice assistant device, a camera, a home appliance, one or more sensors, and so on. Examples of the home appliance may be, but are not limited to, a television (TV), a digital video disc (DVD) player, an audio device, a refrigerator, an air conditioner (AC), an air purifier, a chimney, a cooktop, a vacuum cleaner, an oven, microwave, a washing machine, a dryer, a set-top box, a home automation control panel, a security control panel, a game console, an electronic key, a camcorder, an electronic picture frame, a coffee maker, a toaster oven, a rice cooker, a pressure cooker, and so on. Examples of the sensors may be, but are not limited to, a temperature sensor, a humidity sensor, an infrared sensor, a gyroscope sensor, an atmospheric sensor, a proximity sensor, a red green blue (RGB) sensor (a luminance sensor), a photo sensor, a thermostat, an Ultraviolet (UV) light sensor, a dust sensor, a fire detection sensor, a carbon dioxide ($CO_2$) sensor, a smoke sensor, a window contact sensor, a water sensor, or any other equivalent sensor. A function of each sensor may be intuitively inferred by one of ordinary skill in the art based on its name, and thus, its detailed description is omitted.

The plurality of IoT devices 204a-204n may perform the one or more operations/actions based on their capabilities. Examples of the operations may be, but are not limited to, playing media (audio, video, or the like), capturing the media, purifying the air, performing cooling, or heating of a defined area, controlling lights, sensing various environmental factors (for example: temperature, smoke, humidity, or the like), and so on. The plurality of IoT devices 204a-204n may perform the respective one or more actions simultaneously.

The plurality of IoT devices 204a-204n may register with the IoT cloud server 202 and/or the electronic device 208 by communicating the device information, the capabilities, the operational state, and the location information to the IoT cloud server 202 and/or the electronic device 208, once being deployed in the IoT environment. A user may register the plurality of IoT devices 204a-204n with the IoT cloud server 202 using the electronic device 208.

The plurality of objects 206a-206n referred herein may be at least one of, things, the users, or the like, present in the IoT environment with which entities may interact to perform one or more activities.

In an example, the plurality of objects 206a-206n may be the IoT devices 204a-204n. In another example, the plurality of objects 206a-206n may not be the IoT devices 204a-204n. In an example, the plurality of objects 206a-206n may include at least one of, but is not limited to, a yoga mat, a yoga ball, a towel, clothes, a detergent liquid, vegetables, cooking utensils, broom stick, a knife, a pillow, a water bottle, a door, a window, and so on.

The entities referred herein may include one of, but is not limited to, the users, the IoT devices 204a-204n, and so on. Examples of the one or more activities performed by the entities using the one or more objects may be, but are not limited to, performing yoga/exercise, cooking, cleaning, sleeping, chopping vegetables, and so on. The user may register the plurality of objects 206a-206n with the IoT cloud server 202 and/or the electronic device 208, once being deployed in the IoT environment. Embodiments herein use the terms "objects," "entities," and so on, interchangeably through the document.

The electronic device 208 referred herein may be a device used to control the operations of the plurality of IoT devices 204a-204n and to monitor the one or more objects 206a-206n. The electronic device 208 may also be a user device that is being used by the user to connect, and/or interact, and/or control the operations of the plurality of IoT devices 204a-204n. Examples of the electronic device 208 may be, but are not limited to, a smart phone, a mobile phone, a video phone, a computer, a tablet personal computer (PC), a netbook computer, a laptop, a wearable device, a personal digital assistant (PDA), a workstation, a server, an IoT device, or any other device that may be used to connect, and/or interact, and/or control the operations of the plurality of IoT devices 204a-204n.

The electronic device 208 obtains, stores, and maintains the device information, the capabilities the location information, the operational state, or the like of each device (204a-204n) present in the IoT environment by directly communicating with each device (204a-204n) through the communication network 210. Alternatively, the electronic device 208 obtains, stores, and maintains the device information, the capabilities the location information, the operation state, or the like of each device (204a-204n) present in the IoT environment from the IoT cloud server 202 through the communication network 210.

In an embodiment, the electronic device 208 may be configured to operate the one or more IoT devices 204a-204n based on a change in a relative position of the one or more objects 206a-206n with respect to the one or more entities. Operating the IoT devices 204a-204n include modifying/controlling the operational state of the IoT devices 204a-204n. The electronic device 208 also obtains, determines, or generates a control command for controlling the operational state of the IoT devices 204a-204n, by utilizing the device information, the capabilities, the location information, or the like of each IoT device (204a-204n). The electronic device 208 may transmit the control command to any of the IoT devices 204a-204n to perform actions based on the stored capabilities of the respective IoT devices 204a-204n. The electronic device 208 may receive a result of performing the actions according to the control command from the IoT devices 204a-204n.

For operating the IoT devices 204a-204n, the electronic device 208 monitors a movement of the one or more objects 206a-206n in the IoT environment. On monitoring the movement of the one or more objects 206a-206n, the electronic device 208 identifies the relative position of each of the one or more objects 206a-206n in the second location with respect to the one or more entities. The relative position of an object (e.g., one of the one or more objects 206a-206n) indicates a change in a position of the object from the first location/timestamp T1 to the second location/timestamp T2. In an embodiment herein, the position of the object refers to three dimensional (3D) coordinates. Embodiments herein use the terms such as "relative position," "change in the relative position," "change in the position," and so on, interchangeably through the document.

In an embodiment, the electronic device 208 uses one or more Ultra-wideband (UWB) sensors to monitor the movement of the one or more objects 206a-206n from the first location to the second location and to identify the relative position of the one or more objects 206a-206n in the second location with respect to the entity(ies). The one or more UWB sensors transmit signal pulses using a single omni-directional transmission antenna (Tx) and receives scattered signals/reflected signal/patterns of UWB signals using an omni-directional receiver antenna (Rx). The one or more UWB sensors provide the received patterns of UWB signals/reflected signal to the electronic device 208. The electronic device 208 analyzes various properties of the patterns of UWB signals/reflected signal received from the one or more UWB sensors to monitor the movements of each object and to identify the relative position of each object with respect to the entity. Examples of the properties of the reflected signal may be, but are not limited to, a Received Signal Strength Index (RSSI), a Time Difference of Arrival (TDOA), a Time of Arrival (TOA), an Angle of Arrival (AOA), and so on.

On monitoring the movement of the one or more objects 206a-206n and identifying the relative position of the one or more objects 206a-206n, the electronic device 208 predicts an initiation of the one or more activities by the entity in relation with the identified relative position of the one or more objects 206a-206n with respect to the entity. Examples of the one or more activities, a yoga/meditation activity, a cooking activity, a cleaning activity, a chopping activity, a sleeping activity, and so on.

For predicting the one or more activities, the electronic device 208 detects an interaction of the entity with the one or more objects 206a-206n using the one or more UWB sensors. The electronic device 208 receives the pattern of UWB signals received from the one or more UWB sensors and analyzes the received pattern of UWB sensors to detect the interaction of the entity with one or more objects 206a-206n.

On detecting the interaction of the entity with the one or more objects 206a-206n, the electronic device 208 derives parameters of the entity by analyzing the pattern of UWB signals received from the one or more UWB sensors. Examples of the parameters of the entity may be, but are not limited to, an identity of the entity, vital parameters of the entity, a location of the entity, a timestamp depicting time of interaction of the entity with the one or more objects 206a-206n, and so on. The vital parameters may be derived if the entity is the user. Examples of the vital parameters of the entity may be, but are not limited to, a breathing rate, a heart rate, and so on, of the user. The electronic device 208 also fetches past operation information state for the entity with respect to the one or more objects 206a-206n with which the user has initiated the interaction. The past operation information state provides information about previously monitored one or more activities of the entity, the operational state of the one or more IoT devices 204a-204n associated with the previously monitored one or more activities of the entity, the parameters of the entity associated with the previously monitored one or more activities of the entity, and so on, with respect to the one or more objects 206a-206n. For fetching the past operation information state for the entity, the electronic device 208 creates an object-entity mapping pair. The object-entity mapping pair includes a mapping of the one or more objects 206a-206n and the associated entity. The electronic device 208 fetches the past operation information state from an IoT activity prediction database 314 for the created object-entity mapping pair. The IoT activity prediction database 314 includes the past operation information for the plurality of entities with respect to the one or more objects 206a-206n.

On deriving the parameters of the entity and fetching the past operation information state for the entity, the electronic device 208 groups the one or more objects 206a-206n based on the relative position of the one or more objects 206a-206n in the second location and the identified interaction of the entity with the one or more objects 206a-206n. For grouping each object (e.g., one of the one or more objects 206a-206n), the electronic device 208 computes a relative positional change index for the object (e.g., one of the one or more objects 206a-206n). The relative positional change index of the object (e.g., one of the one or more objects 206a-206n) indicates a probability for considering the object for the grouping. The electronic device 208 computes the relative positional change index for the object (e.g., one of the one or more objects 206a-206n) based on a position of the object (e.g., one of the one or more objects 206a-206n) with respect to the entity in the first location at a timestamp T1 and the relative position of the object (e.g., one of the one or more objects 206a-206n) with respect to the entity in the second location at a timestamp T2. The electronic device 208 compares the relative positional change index computed for each object (e.g., one of the one or more objects 206a-206n) with a threshold. If the relative positional change index of the object is less than the threshold, the electronic device 208 does not consider the respective object for the grouping. If the relative positional change index of the object is greater than the threshold, the electronic device 208 considers the respective object for the grouping.

Figure 4:
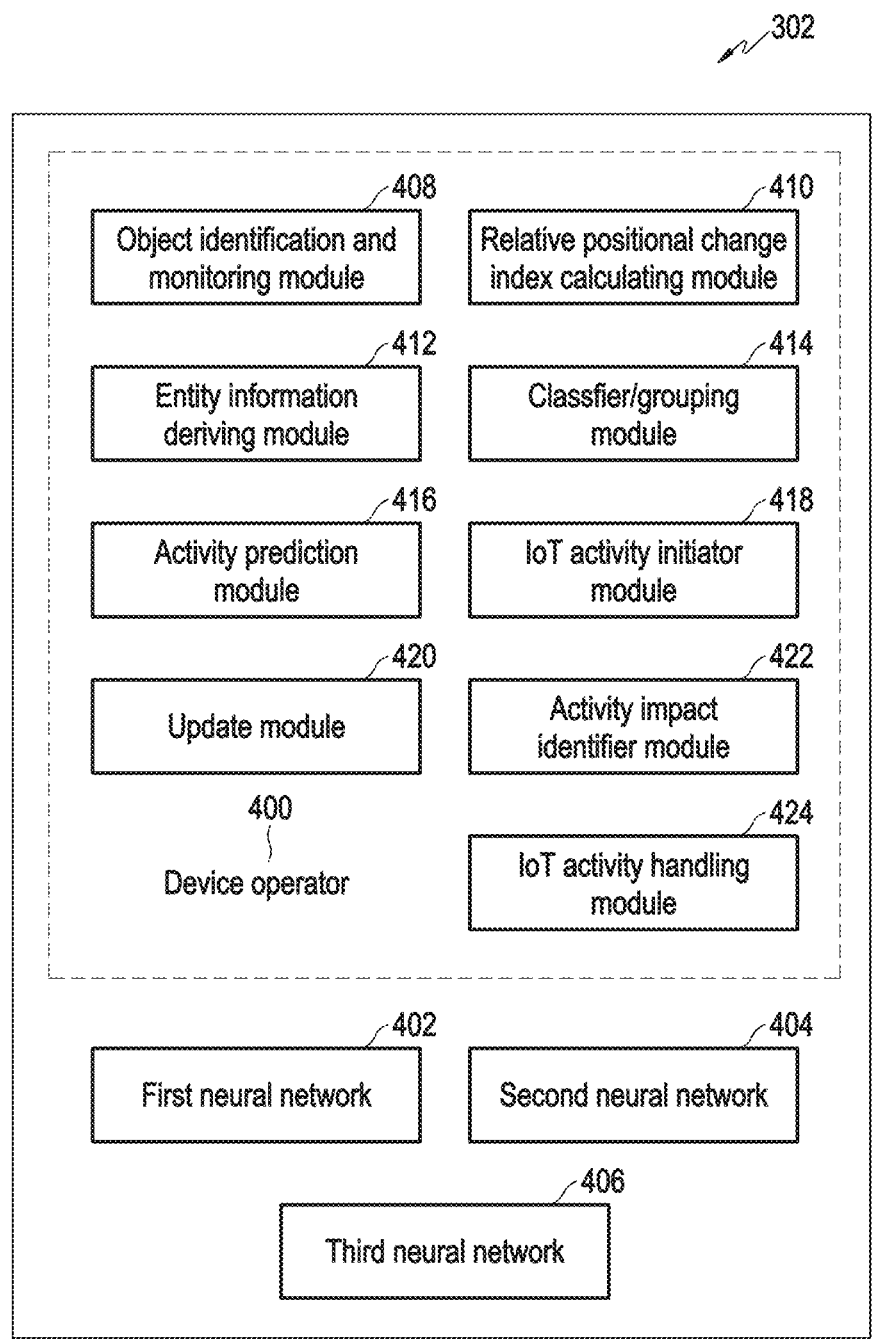
FIG. 4 depicts a device operator performable in the electronic device for operating the IoT devices, according to an embodiment of the disclosure.

FIG. 4 depicts a device operator performable in the electronic device for operating the IoT devices, according to an embodiment of the disclosure.

Referring to FIG. 4, on computing the relative positional change index for each object (e.g., one of the one or more objects 206a-206n), an electronic device 208 analyzes at least one of, the relative positional change index of each object, the interaction of the entity with one or more objects 206a-206n, and a past operation information state of the entity using a first neural network 402 (as depicted in FIG. 4) to group the one or more objects 206a-206n. Grouping the one or more objects 206a-206n using the first neural network is described in detail in conjunction with FIG. 4.

On grouping the one or more objects, the electronic device 208 predicts the initiation of the one or more activities by the entity in relation with the identified relative position of the one or more objects 206a-206n with respect to the entity. The electronic device 208 predicts the initiation of the one or more activities by the entity by analyzing at least one of, but is not limited to, the detected interaction of the entity with the one or more objects 206a-206n, the parameters of the entity, the past operation information state of the entity, the grouping of each of the one or more objects 206a-206n, and so on.

Figure 3:
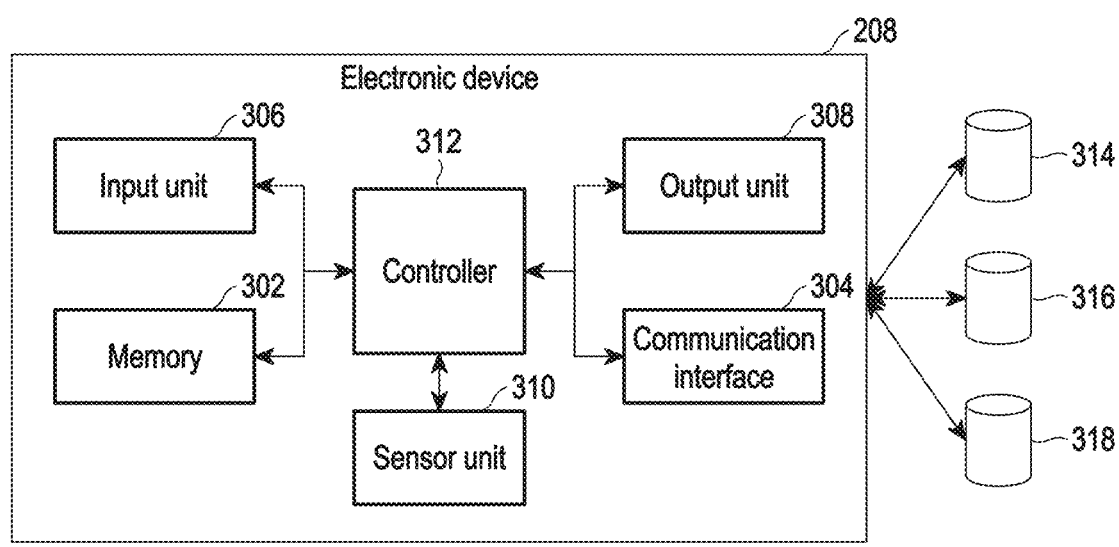
FIG. 3 is a block diagram depicting various components of an electronic device for operating IoT devices, according to an embodiment of the disclosure.

On predicting the initiation of the one or more activities by the entity in relation with the identified relative position of the one or more objects 206a-206n with respect to the entity, the electronic device 208 modifies the operational state of the one or more IoT devices 204a-204n associated with the predicted one or more activities. For modifying the operational state of the one or more IoT devices 204a-204n, the electronic device 208 detects the one or more IoT devices 204a-204n associated with the predicted activities. For detecting the one or more IoT devices 204a-204n, the electronic device 208 fetches previous operational state changes for the predicted one or more activities from an activity device mapping database 316 (as depicted in FIG. 3). The previous operational state changes indicate information about the IoT devices 204a-204n and the associated operational state changes with respect to the previously monitored activities that have been initiated by the entity. The electronic device 208 analyzes at least one of, but is not limited to, the predicted one or more activities, the previous operational state changes fetched for the predicted one or more activities, the past operation information state of the entity, the grouping of the one or more objects 206a-206n along with the entity, and so on, using a second neural network 404 to detect the one or more IoT devices 204a-204n for the predicted one or more activities. The detection of the IoT devices 204a-204n for the predicted activities using the second neural network 404 is depicted in FIG. 4.

Once the one or more IoT devices 204a-204n have been detected for the predicted one or more activities, the electronic device 208 detects a current operational state of the one or more IoT devices 204a-204n detected for the predicted one or more activities. In an example, the electronic device 208 may detect the current operational state of the one or more IoT devices 204a-204n by communicating directly with the one or more IoT devices 204a-204n. In another example, the electronic device 208 may detect the current operational state of the one or more IoT devices 204a-204n by communicating with the IoT cloud server 202. On detecting the current operational state of the one or more IoT devices 204a-204n, the electronic device 208 generates a correlation of the predicted one or more activities with the one or more objects 206a-206n in the first location and the second location, the relative position of the one or more objects 206a-206n with respect to the entity, and the current operational state of the one or more IoT devices 204a-204n. The electronic device 208 modifies the operational state of the one or more IoT devices 204a-204n associated with the predicted one or more activities simultaneously with the predicted one or more activities. The electronic device 208 modifies the operational state of the one or more IoT devices 204a-204n by analyzing at least one of, but is not limited to, the generated correlation, the predicted one or more activities, the past operation information state of the entity, the current operational state of the one or more IoT devices 204a-204n, user preferences, and so on. In an example, the user preferences indicate the IoT devices, whose operational state has to be changed, the specific operational states, an association of the IoT devices 204a-204n with the specific activities, and so on.

The electronic device 208 further reverts the modified operational state of the one or more IoT devices to a previous operational state, on detecting that the entity moves away from the respective one or more objects 206a-206n. The electronic device 208 reverts the modified operational state of the one or more IoT devices 204a-204n to the previous operational state using a previous IoT device status history. The previous IoT device status history indicates the operational state of the IoT devices at each timestamp.

In an embodiment, the electronic device 208 also determines an intensity of the one or more activities being performed by the entity. For determining the intensity of each activity, the electronic device 208 monitors one or more intensity factors for the activity. The intensity factors include at least one of, but is not limited to, the vital parameters of the entity involved in the one or more activities, a change in a relative position of the entity involved in the one or more activities, a change in an ambience due to the one or more activities, and so on. The electronic device 208 receives the pattern of UWB signals from the one or more UWB sensors and analyzes the properties of the received pattern of UWB signals to determine the one or more intensity factors for the activity. On determining the one or more intensity factors for each activity, the electronic device 208 determines the intensity of each activity by processing the monitored intensity factor using a third neural network 406. Determining the intensity of the one or more activities using the third neural network is described in detail in conjunction with FIG. 4.

On determining the intensity of the one or more activities, the electronic device 208 may (or may not) tune the operational state of the IoT devices 204a-204n associated with the one or more activities based on the intensity of the one or more activities and past history stored for the one or more activities in an activity database 318.

FIG. 2 shows blocks of the IoT system 200, but it is to be understood that other embodiments are not limited thereon. In other embodiments, the IoT system 200 may include a greater or lesser number of blocks. Further, the labels or names of the blocks are used only for illustrative purpose and does not limit the scope of the embodiments herein. One or more blocks can be combined together to perform same or substantially similar function in the IoT system 200.

FIG. 3 is a block diagram depicting various components of an electronic device for operating IoT devices, according to an embodiment of the disclosure.

Referring to FIG. 3, an electronic device 208 includes a memory 302, a communication interface 304, an input unit 306, an output unit 308, a sensor unit 310, and a processor (e.g., controller 312). The electronic device 208 may also be coupled with the IoT activity prediction database 314, the activity device mapping database 316, and the activity database 318. The IoT activity prediction database 314 includes information about the past operation information state of the plurality of entities with respect to the one or more objects 206a-206n. The activity device mapping database 316 includes the previous operational state changes for the plurality of activities. The activity database 318 includes the past history stored for the particular activity.

The memory 302 referred herein may include at least one type of storage medium, from among a flash memory type storage medium, a hard disk type storage medium, a multimedia card micro type storage medium, a card type memory (for example, a secure digital (SD) or an extreme digital (XD) memory), random-access memory (RAM), static RAM (SRAM), read-only memory (ROM), electrically erasable programmable ROM (EEPROM), programmable ROM (PROM), a magnetic memory, a magnetic disk, or an optical disk. The memory 302 may store at least one of, but is not limited to, the movement of the one or more objects 206a-206n, the relative position of the one or more objects 206a-206n with respect to the one or more entities, the activities initiated by the one or more entities with respect to the one or more objects 206a-206n, the past operation information state of the plurality of entities, the current operational state of the plurality of IoT devices 204a-204n, the previous IoT device status history, information about the modified operational state of the IoT devices 204a-204n, the intensity of the activities being performed by the entities, and so on.

The memory 302 may also store a device operator 400 (as depicted in FIG. 4), which has been executed by the controller 312 to operate the IoT devices 204a-204n in the IoT environment based on the change in the relative position of the one or more objects 206a-206n with respect to the one or more entities.

The memory 302 may also store the first neural network 402, the second neural network 404, and the third neural network 406 (as depicted in FIG. 4). The first neural network 402 may be processed by the controller 312 to group the one or more objects 206a-206n. The second neural network 404 may be processed by the controller 312 to detect the IoT devices 204a-204n for the predicted one or more activities. The third neural network 406 may be processed by the controller 312 to determine the intensity of the one or more activities.

Examples of the first neural network 402, the second neural network 404, and the third neural network 406 may be, but are not limited to, an Artificial Intelligence (AI) model, a multi-class Support Vector Machine (SVM) model, a Convolutional Neural Network (CNN) model, a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep reinforcement model (with rectified linear unit (ReLU) activation), a deep Q-network, and so on. The first neural network 402, the second neural network 404, and the third neural network 406 may include a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients. A topology of the layers of the first neural network 402, the second neural network 404, and the third neural network 406 may vary based on the type of the first neural network 402, the second neural network 404, and the third neural network 406, respectively. In an example, the first neural network 402, the second neural network 404, and the third neural network 406 may include an input layer, an output layer, and a hidden layer. The input layer receives a layer input (depending upon on the associated first/second/third neural network) and forwards the received layer input to the hidden layer. The hidden layer transforms the layer input received from the input layer into a representation, which may be used for generating the output in the output layer. The hidden layers extract useful/low level features from the input, introduce non-linearity in the network and reduce a feature dimension to make the features equivalent to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The first neural network 402, the second neural network 404, and the third neural network 406 may be trained using at least one learning method to group the one or more objects 206a-206n, detect the one or more IoT devices 204a-204n for the predicted one or more activities, and determine the intensity of the one or more activities, respectively. Examples of the learning method may be, but are not limited to, supervised learning, unsupervised learning, semi-supervised learning, reinforcement learning, regression-based learning, and so on. The trained first neural network 402/the second neural network 404/the third neural network 406 may be a neural network model in which a number of layers, a sequence for processing the layers and parameters related to each layer may be known and fixed for performing the intended functions. Examples of the parameters related to each layer may be, but are not limited to, activation functions, biases, input weights, output weights, and so on, related to the layers. A function associated with the learning method may be performed through the non-volatile memory, the volatile memory, and the controller 312. The controller 312 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors group the one or more objects 206a-206n, detect the one or more IoT devices 204a-204n for the predicted one or more activities, and determine the intensity of the one or more activities in accordance with a predefined operating rule of the first neural network 402, the second neural network 404, and the third neural network 406, respectively, stored in the non-volatile memory and the volatile memory. The predefined operating rules of the first neural network 402, the second neural network 404, and the third neural network 406 are provided through training the modules using the learning method.

Here, being provided through learning means that, by applying the learning method to a plurality of learning data, a predefined operating rule or the first neural network 402/the second neural network 404/the third neural network 406 of a desired characteristic is made. Grouping the one or more objects 206a-206n, detecting the one or more IoT devices 204a-204n for the predicted one or more activities, and determining the intensity of the one or more activities may be performed in the electronic device 208 itself in which the learning according to an embodiment is performed, and/or may be implemented through a separate server/system.

The communication interface 304 may include one or more components, which allow the electronic device 208 to communicate with another device (for example: another electronic device, the IoT cloud server 202, the plurality of IoT devices 204a-204n, and so on) using the communication methods that have been supported by the communication network 210. The communication interface 304 may include the components such as, a wired communicator, a short-range communicator, a mobile/wireless communicator, and a broadcasting receiver.

The wired communicator may allow the electronic device 208 to communicate with the other devices using the communication methods such as, but are not limited to, wired LAN, the Ethernet, and so on. The short-range communicator may allow the electronic device 208 to communicate with the other devices using the communication methods such as, but are not limited to, Bluetooth low energy (BLE), near field communicator (NFC), WLAN (or Wi-fi), Zigbee, infrared data association (IrDA), Wi-Fi direct (WFD), UWB communication, Ant+ (interoperable wireless transfer capability) communication, shared wireless access protocol (SWAP), wireless broadband internet (WiBro), wireless gigabit alliance (WiGig), and so on. The mobile communicator may transceive wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 208 may or may not include the broadcasting receiver.

The input unit 306 may be configured to allow the user to interact with the electronic device 208.

The output unit 308 may be configured to indicate the modified operational state of the IoT devices 204a-204n to the user. The output unit 308 may include at least one of, for example, but is not limited to, a sound output module/voice assistant module, a display, a vibration motor, a User Interface (UI) module, a light emitting device, and so on, to indicate the modified operational state of the IoT devices 204a-204n to the user. The UI module may provide a specialized UI or graphics user interface (GUI), or the like, synchronized to the electronic device 208, according to the applications.

The sensor unit 310 may include the one or more UWB sensors, which may be used for monitoring the movements of the one or more objects 206a-206n, identifying the relative position of the one or more objects 206a-206n with respect to the one or more entities, deriving the parameters of the entity, and determining the intensity of the one or more activities.

The controller 312 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 312 may be configured to operate the IoT devices 204a-204n in the IoT environment based on the change in the relative position of the one or more objects 206a-206n with respect to the one or more entities. The controller 312 monitors the movement of the one or more objects 206a-206n and identifies the relative position of the one or more objects 206a-206n with respect to the one or more entities. The controller 312 predicts the initiation of the one or more activities by the one or more entities in relation with the determined relative position of the one or more objects 206a-206n with respect to the one or more entities. The controller 312 modifies the operational state of the one or more IoT devices 204a-204n associated with the predicted one or more activities.

The controller 312 also determines the intensity of the one or more activities being performed by the one or more entities. The controller 312 tunes the operational state of the one or more IoT devices 204a-204n associated with the one or more activities based on the determined intensity of the one or more activities.

The controller 312 processes/executes the device operator 400 to operate the IoT devices 204a-204n in the IoT environment. As depicted in FIG. 4, the device operator 400 includes an object identification and monitoring module 408, a relative positional change index calculating module 410, an entity information deriving module 412, a classifier/grouping module (e.g., classifier module 414), an activity prediction module 416, an IoT activity initiator module 418, an update module 420, an activity impact identifier module 422, and an IoT activity handling module 424.

Figure 5A:
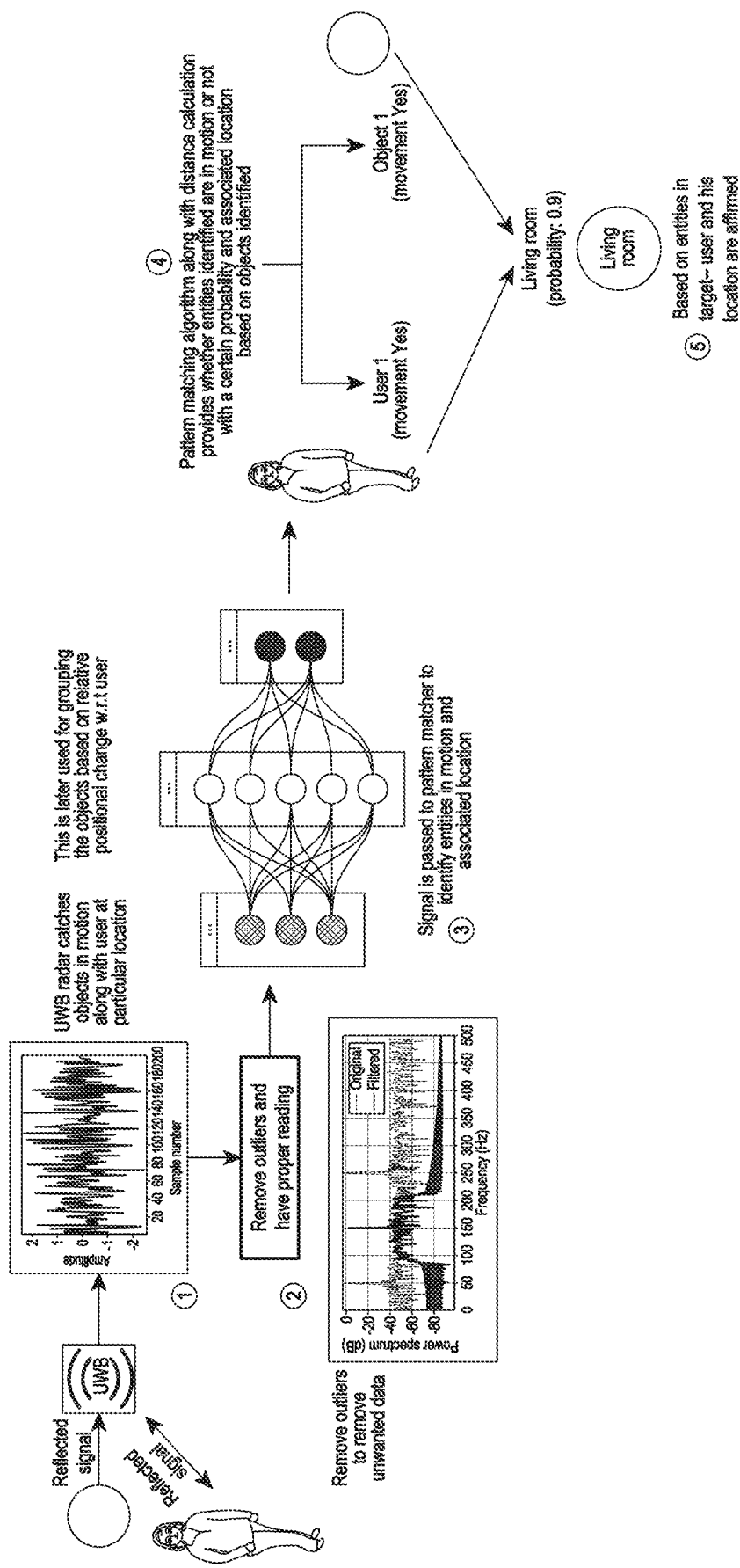
FIGS. 5A and 5B are example diagrams depicting detecting a movement of one or more objects along with a user and identifying a relative position of the one or more objects, according to various embodiments of the disclosure.
Figure 5B:
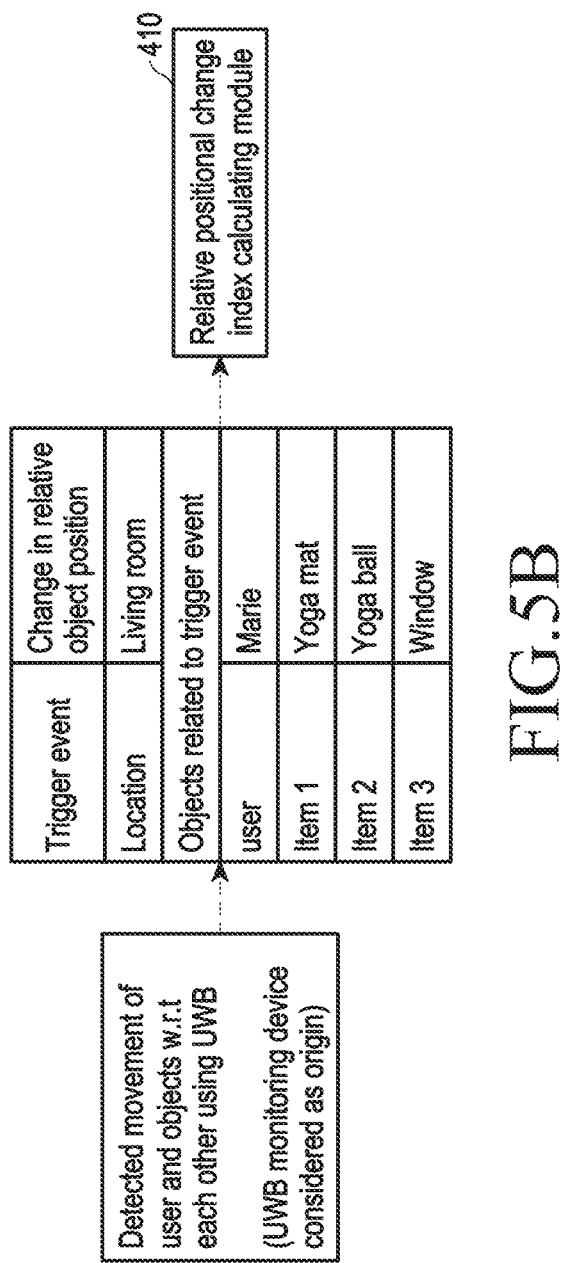

FIGS. 5A and 5B are example diagrams depicting detecting a movement of one or more objects along with a user and identifying a relative position of the one or more objects, according to various embodiments of the disclosure.

The object identification and monitoring module 408 may be configured to detect the movement of the one or more objects 206a-206n from one position to another and identify the relative position of the one or more objects with respect to the one or more entities. The object identification and monitoring module 408 uses the one or more UWB sensors to detect the movement of the objects and identify the relative position of the one or more objects 206a-206n with respect to the one or more entities. The relative position of the object (e.g., one of the one or more objects 206a-206n) may be provided in a form of the 3D coordinates. The object identification and monitoring module 408 also identifies the position of each object (e.g., one of the one or more objects 206a-206n) at the different timestamps using the one or more UWB sensors. The object identification and monitoring module 408 is described in detail in conjunction with FIG. 5A.

Referring to FIG. 5A, for detecting the movement of the objects and identifying the relative position of the one or more objects, the object identification and monitoring module 408 allows the UWB sensor(s) to transmit the radar signal in the IoT environment and receives the reflected signal from the object(s) (e.g., one of the one or more objects 206a-206n) and the entity(ies). In an example, consider the object as a yoga ball and the entity as a user. The object identification and monitoring module 408 receives the reflected signal/patterns of UWB signals from the UWB sensor for detecting the movement of the yoga ball with respect to the user at the particular location. The object identification and monitoring module 408 removes outliers from the received patterns of UWB signals to remove unwanted data. The object identification and monitoring module 408 passes the patterns of UWB signals after removing the outliers to a pattern matcher 502. The pattern matcher 502 detects the movement of the object(s) from the first location to the second location and determines the relative position of the object(s) in the second location with respect to the entity(ies) using a pattern matching method with distance calculation. The pattern matching method with distance calculation may be inferred by an ordinary person skilled in the art based on its name, thus its detailed description is omitted. The pattern matcher 502 detects the movement of the object(s) and determines the relative position of the object(s) with respect to the entity(ies) with a certain probability and the associated location. In an example herein, the pattern matcher 502 detects that the yoga ball is in motion with respect to the user at a living room (an example of the location) with an example probability of 0.9. Thus, based on the objects 206a-206n, the entity/user and the associated location may be affirmed. The pattern matcher 502 may also determine the position of the object at the first location.

Referring to FIG. 5B, an example table indicating the movement of the objects with respect to the user is depicted in FIG. 5B.

The object identification and monitoring module 408 provides the information about the detected movement of the object(s) and the relative position of the object(s) with respect to the entity to the relative positional change index calculating module 410.

Figure 6:
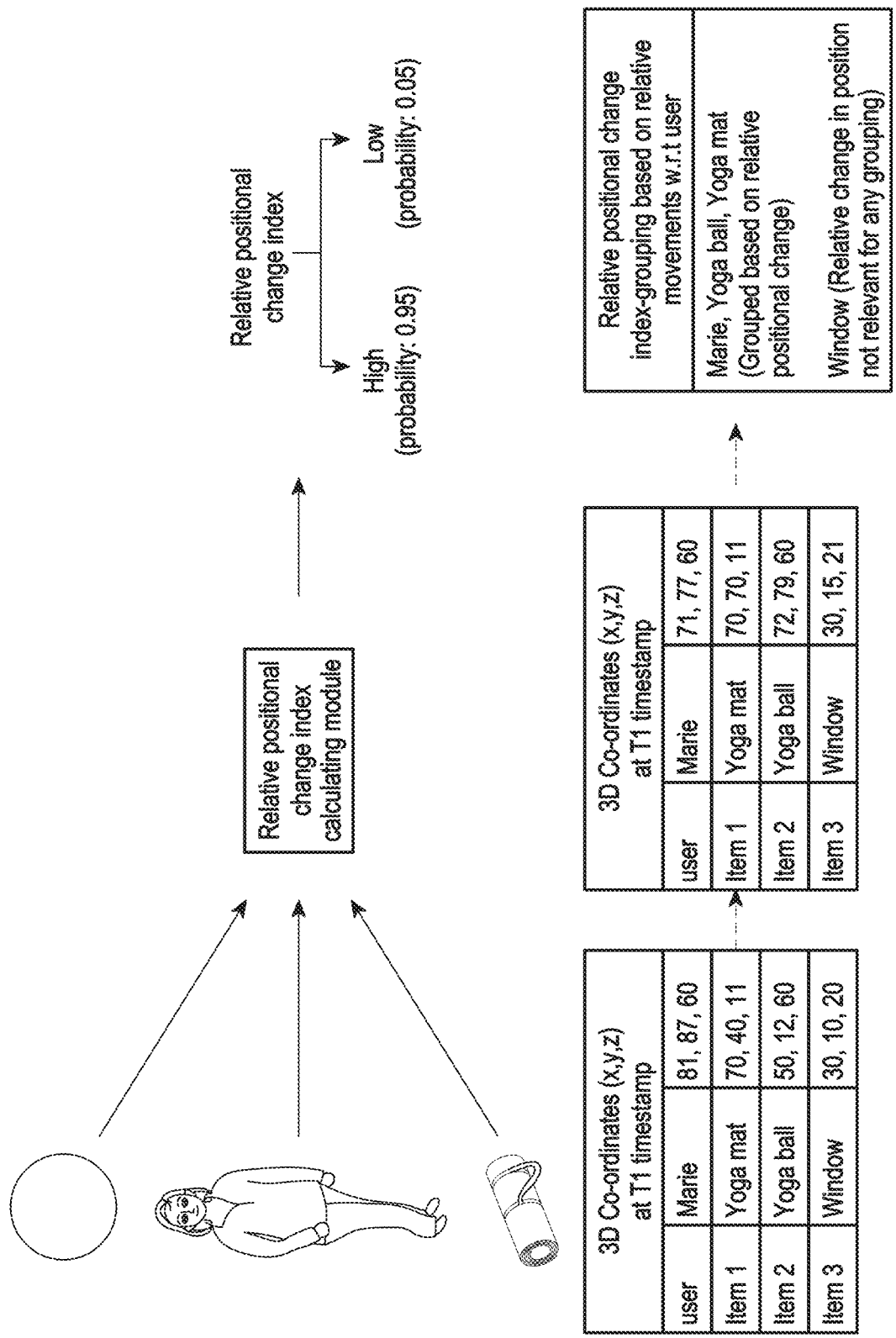
FIG. 6 is an example diagram depicting calculation of a relative positional change index of the one or more objects, according to an embodiment of the disclosure.

FIG. 6 is an example diagram depicting calculation of a relative positional change index of the one or more objects, according to an embodiment of the disclosure.

The relative positional change index calculating module 410 may be configured to determine the relative positional change index for each object, based on the detected movement of the corresponding object with respect to the entity(ies). The relative positional change index calculating module 410 is described in detail in conjunction with FIG. 6.

Referring to FIG. 6, a relative positional change index calculating module 410 receives the position/3D coordinates of one or more objects 206a-206n with respect to one or more entities at a first location/timestamp T1 and a second location/timestamp T2 from an object identification and monitoring module 408. In an example herein, consider that the objects 206a-206n may include a yoga mat, a yoga ball, and a window, and the entity may be a user. The relative positional change index calculating module 410 calculates the relative positional change index for the yoga mat, the yoga ball, and the window with respect to the user based on a difference of the associated coordinates at the first location/T1 and the second location/T2. The relative positional change index of the object may indicate the probability, which determines whether to consider the object for grouping or not. For example, the relative positional change index calculated for the yoga mat, the yoga ball, and the window may be high, high, and low, respectively. In such a scenario, the yoga ball, and the yoga mat may be considered to group along with the user and the window may be discarded from grouping. The relative positional change index provides the relative positional change index of each object (e.g., one of the one or more objects 206a-206n) to the classifier module 414.

The entity information deriving module 412 may be configured to detect the interaction of the one more entities with the one or more objects 206a-206n (whose movement has been detected) and derive the parameters of the one or more entities using the one or more UWB sensors. The entity information deriving module 412 may also be configured to fetch the past operation information state for each entity from the IoT activity prediction database 314 with respect to the one or more objects 206a-206n with which the corresponding entity has been interacted. The entity information deriving module 412 provides the information about the detected interaction of the one or more entities with the one or more objects 206a-206n, the parameters of the one or more entities, and the past operation information state of the one or more entities to the classifier module 414.

Figure 7:
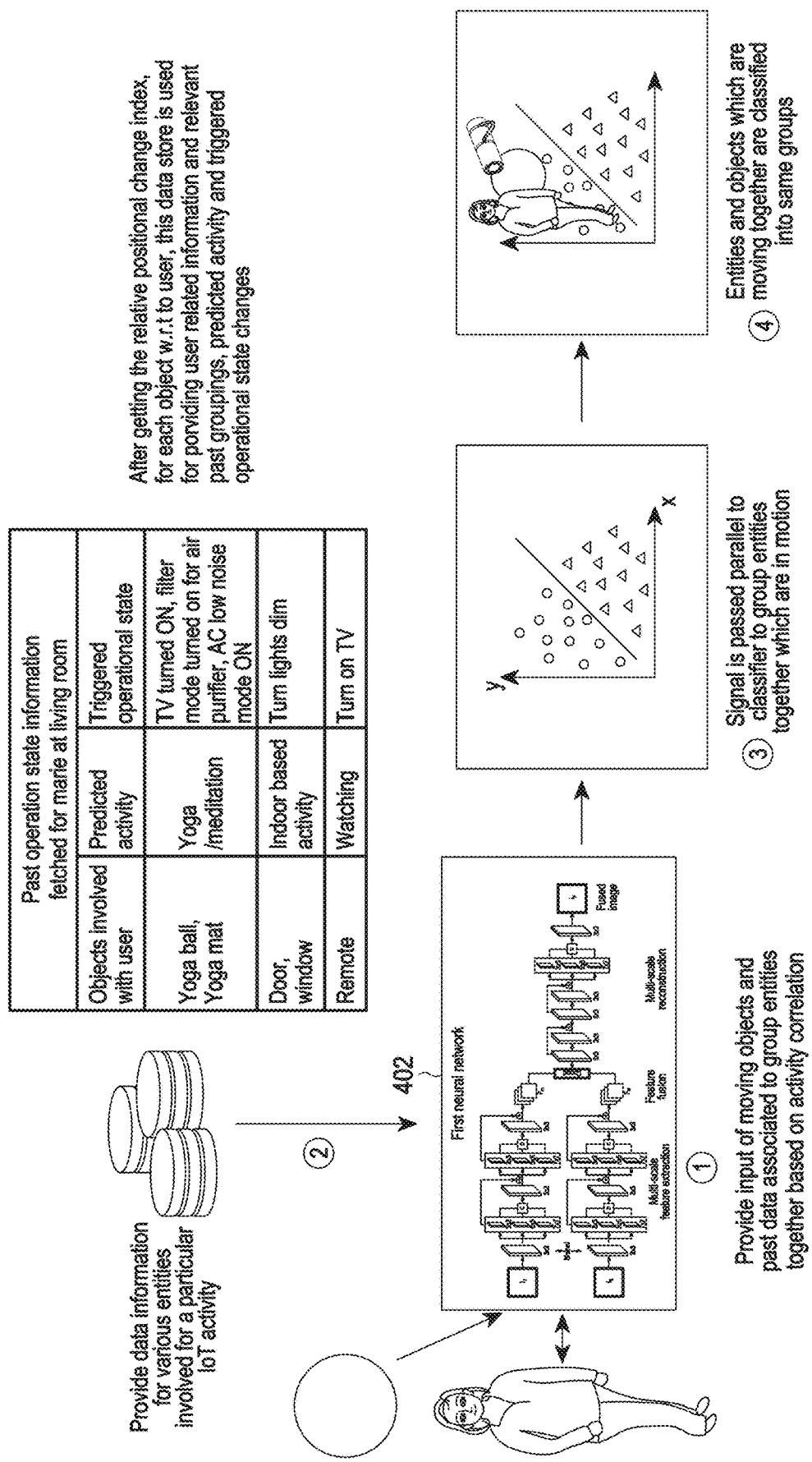
FIG. 7 is an example diagram depicting grouping of the one or more objects along with entities, according to an embodiment of the disclosure.

FIG. 7 is an example diagram depicting grouping of the one or more objects along with entities, according to an embodiment of the disclosure.

The classifier module 414 may be configured to group the one or more objects 206a-206n with respect to the one or more entities. The classifier module 414 is depicted in detail in conjunction with FIG. 7.

Referring to FIG. 7, a classifier module 414 uses a first neural network 402 to group one or more objects 206a-206n with respect to one or more entities. The classifier module 414 provides the relative positional change index of each object, the interaction of the one or more entities with the one or more objects 206a-206n, and the past operation information state of the entities of the one or more objects 206a-206n as inputs to the first neural network 402. The first neural network 402 processes the received inputs and classifies the one or more objects 206a-206n and the one or more entities moving together into the same group. For example, as depicted in FIG. 7, the classifier module 414 classifies the user moving together with a yoga mat and a yoga ball into the same group. The classifier module 414 provides information about the grouping of the one or more objects 206a-206n along with one or more entities to the activity prediction module 416.

The activity prediction module 416 may be configured to predict the initiation of the one or more activities by the one or more entities in relation with the identified relative position of the one or more objects 206a-206n with respect to the one or more entities. The activity prediction module 416 analyzes at least one of, the detected interaction of the one or more entities with the one or more objects 206a-206n, the parameters of the one or more entities, the past operation information state, the grouping of the one or more objects 206a-206n, and so on, to predict the initiation of the one or more activities by the one or more entities in relation with the identified relative position of the one or more objects 206a-206n with respect to the one or more entities.

Figure 8:
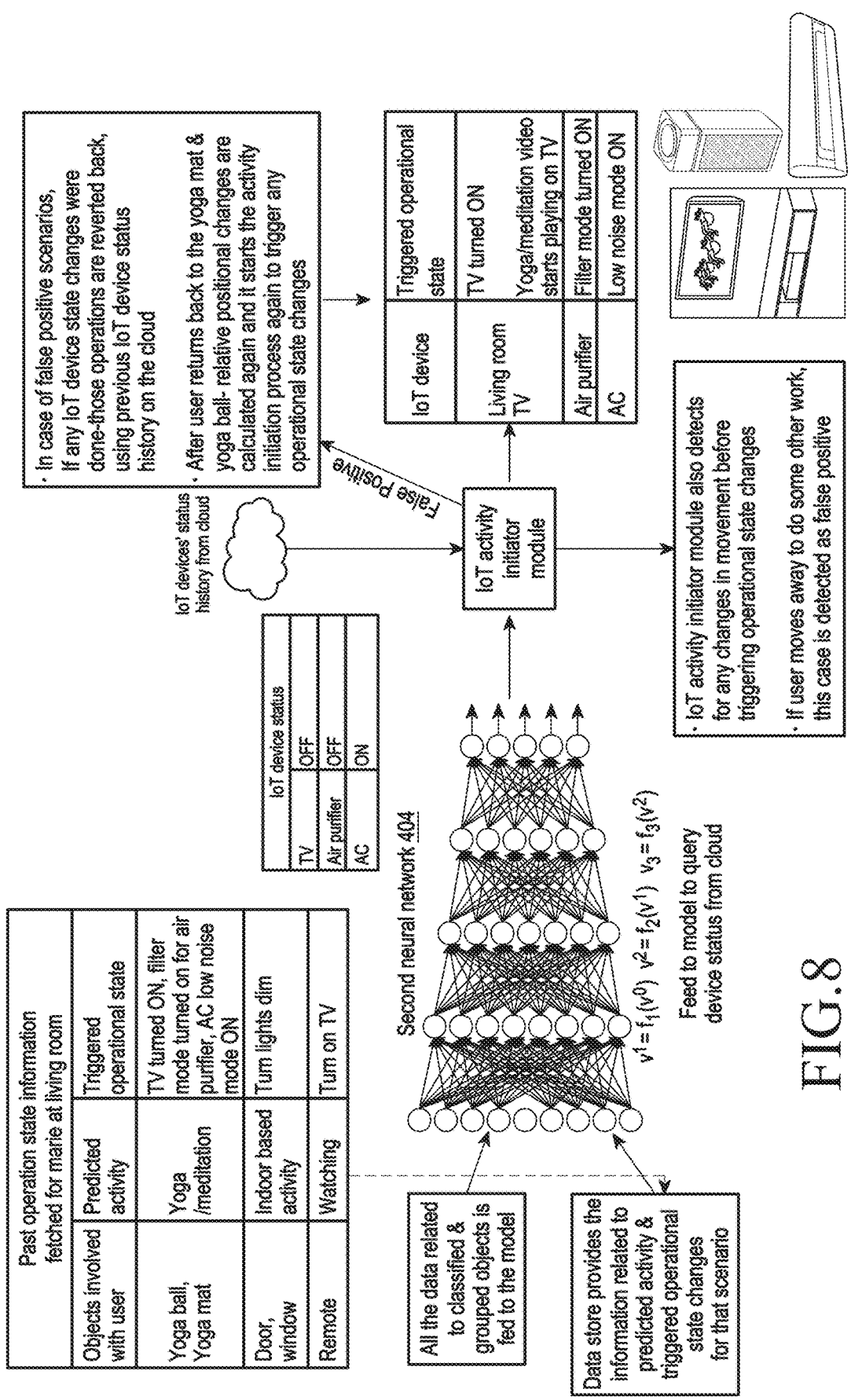
FIG. 8 is an example diagram depicting prediction of initiation of one or more activities by the entities, according to an embodiment of the disclosure.

FIG. 8 is an example diagram depicting prediction of initiation of one or more activities by the entities, according to an embodiment of the disclosure.

The IoT activity initiator module 418 may be configured to modify the operational state of the one or more IoT devices 204a-204n based on the predicted activities. The IoT activity initiator module 418 is described in detail in conjunction with FIG. 8.

Referring to FIG. 8, for modifying the operational state of one or more IoT devices 204a-204n, an IoT activity initiator module 418 accesses the previous operational state changes for the predicted one or more activities from an activity device mapping database 316. The IoT activity initiator module 418 feeds at least one of, but is not limited to, the predicted one or more activities, the past operation information state of the entity, the grouping of the one or more objects 206a-206n along with one or more entities, the previous operational state changes with respect to the predicted one or more activities, and so on, to the second neural network 404 as inputs. The second neural network 404 analyzes the received inputs to detect the one or more IoT devices 204a-204n for the predicted one or more activities.

For example, consider that the activity prediction module 416 predicts that a user is going to perform a yoga, on detecting the movement of a yoga ball and a yoga mat along with the user. In such a scenario, the IoT activity initiator module 418 provides the information about the predicted activity, the past operation information state of the user (which provides information about the previous activities initiated by the user with respect to the interaction of the yoga ball and the yoga mat and the associated operational state changes of the IoT devices 204a-204n), the grouping of the yoga ball and the yoga mat along with the user, the previous operational state changes with respect to the predicted activity (i.e., performing the yoga), and so on, to the second neural network 404. The second neural network 404 detects the IoT devices 204a-204n such as, a Television (TV), an air purifier, and an Air Conditioner (AC) present in the second location (i.e., the location where the user is present) as the associated IoT devices 204a-204n for performing the yoga. The IoT activity initiator module 418 detects the current operational state of the TV, the air purifier, and the AC by communicating with the IoT cloud server 202 or by directly communicating with the TV, the air purifier, and the AC. The IoT activity initiator module 418 generates the correlation of the predicted one or more activities with the one or more objects 206a-206n (the yoga ball and the yoga mat), the relative position of the one or more objects 206a-206n with respect to the user, and the current operational state of the TV, the air purifier, and the AC. The IoT activity initiator module 418 modifies the operational state of the TV, the air purifier, and the AC, based on the generated correlation and the user preferences. In an example herein, as depicted in FIG. 8, the IoT activity initiator module 418 turns ON the TV and plays a yoga/meditation video on the TV, turns ON the air purifier, and sets a mode of the AC to a low noise mode.

Figure 9:
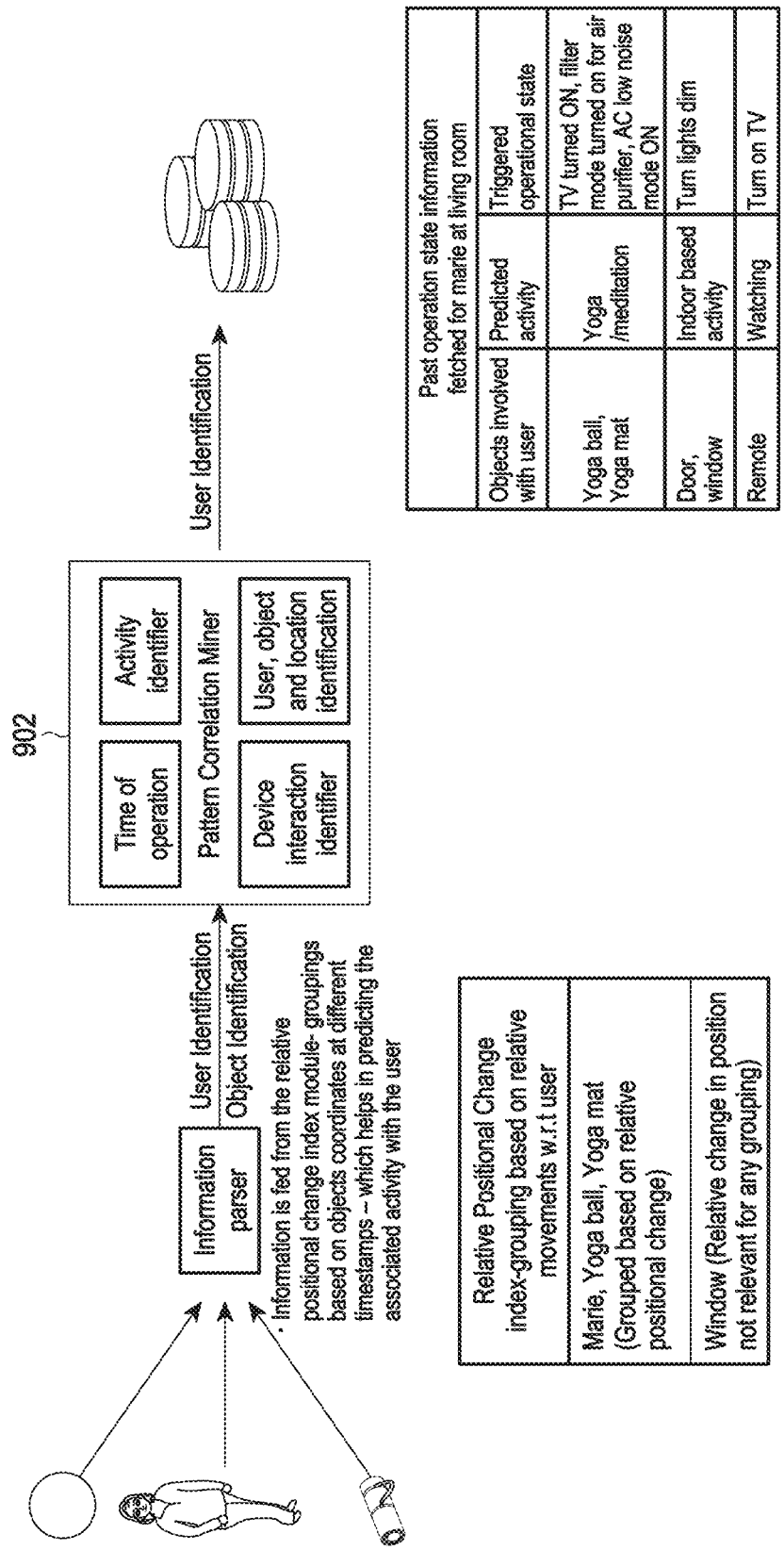
FIG. 9 is an example diagram depicting updating of an IoT activity prediction database, according to an embodiment of the disclosure.

FIG. 9 is an example diagram depicting updating of an IoT activity prediction database, according to an embodiment of the disclosure.

The update module 420 may be configured to update the IoT activity prediction database 314 with information about the modified operational state of the one or more IoT devices 204a-204n with respect to the entity and the associated one or more objects 206a-206n. The update module 420 is described in detail in conjunction with FIG. 9.

Referring to FIG. 9, an update module 420 provides information about one or more objects 206a-206n and associated one or more entities, one or more activities initiated by the entities, and a modified/triggered operational state of IoT devices 204a-204n associated with the initiated one or more activities to a pattern correlation miner 902. The pattern correlation miner 902 creates a mapping of the modified/triggered operational state of the IoT devices 204a-204n with the one or more objects 206a-206n, the one or more entities, the one or more activities initiated by the one or more entities, the interaction of the one or more entities with the one or more objects 206a-206n, the time of operation, and the location of the one or more objects 206a-206n, the one or more entities, and the one or more IoT devices 204a-204n. The pattern correlation miner 902 stores the mapping as the past operation information state in the IoT activity prediction database 314.

The activity impact identifier module 422 may be configured to determine the intensity of the one or more activities being performed by the one or more entities.

Figure 10A:
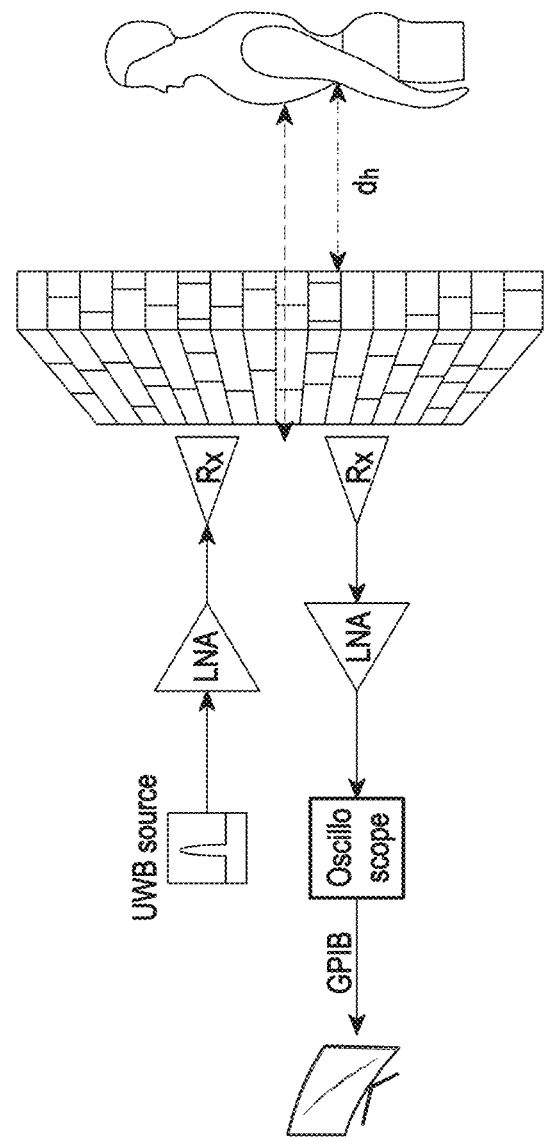
FIG. 10A is an example diagram depicting monitoring of an intensity of an activity, according to an embodiment of the disclosure.

FIG. 10A is an example diagram depicting monitoring of an intensity of an activity, according to an embodiment of the disclosure.

Figure 10B:
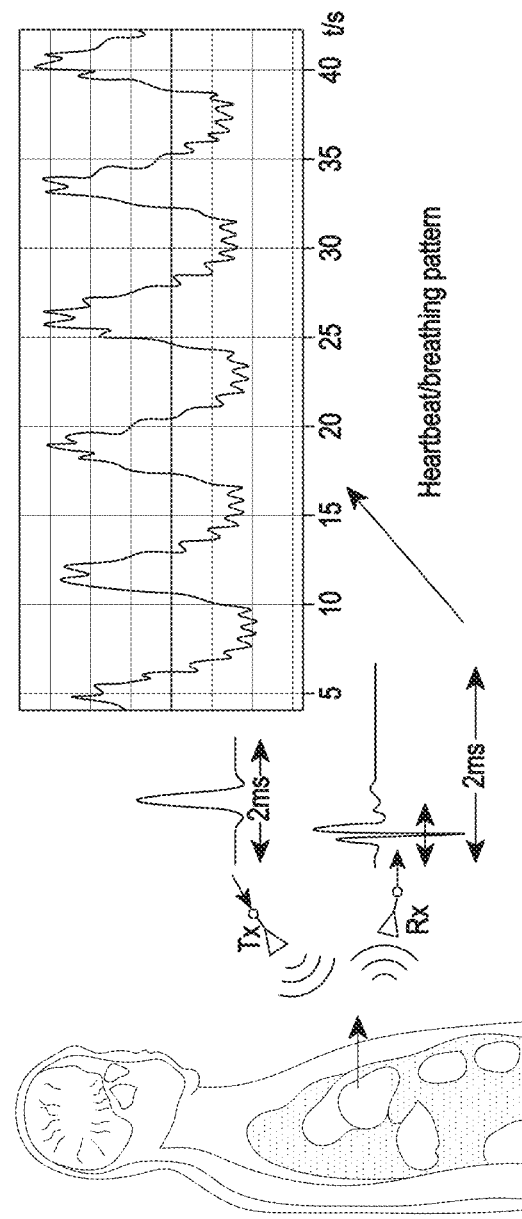
FIG. 10B is an example diagram depicting monitoring of vital parameters using Ultra-Wideband (UWB) sensors, according to an embodiment of the disclosure.

FIG. 10B is an example diagram depicting monitoring of vital parameters using Ultra-Wideband (UWB) sensors, according to an embodiment of the disclosure.

Figure 10C:
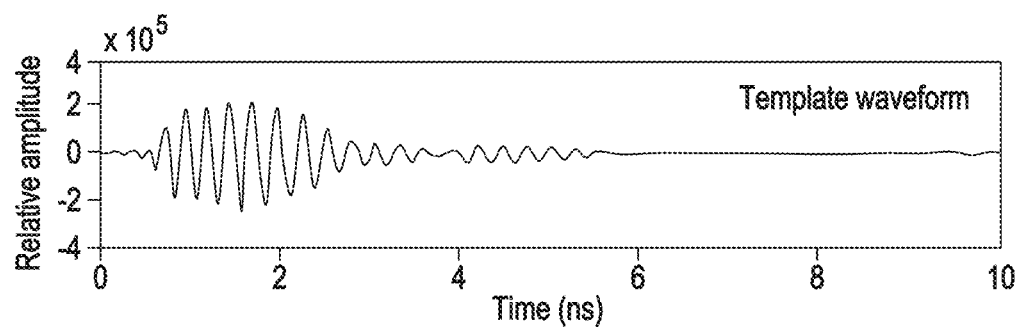
FIG. 10C is an example diagram depicting monitoring of a change in a relative position of an entity using the UWB sensors, according to an embodiment of the disclosure.

FIG. 10C is an example diagram depicting monitoring of a change in a relative position of an entity using the UWB sensors, according to an embodiment of the disclosure.

Figure 10D:
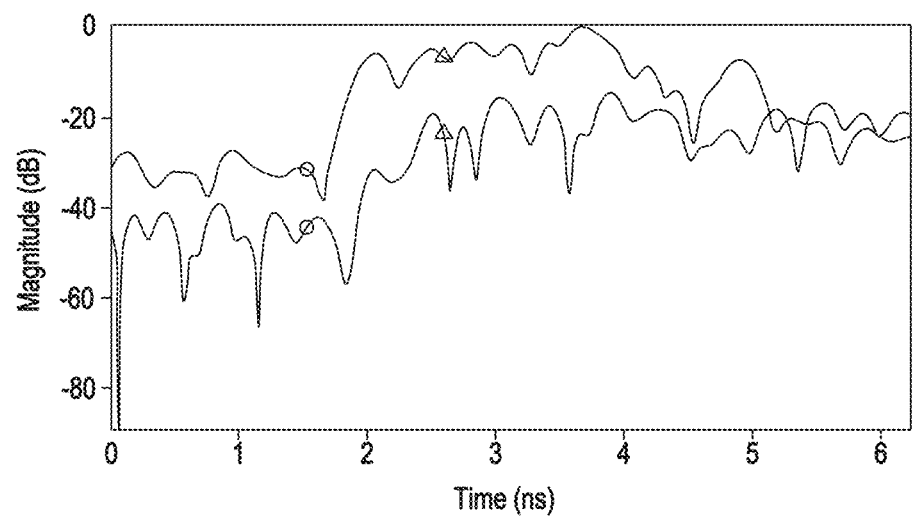
FIG. 10D is an example diagram depicting monitoring of change in an ambience due to the one or more activities, according to an embodiment of the disclosure.

FIG. 10D is an example diagram depicting monitoring of change in an ambience due to the one or more activities, according to an embodiment of the disclosure.

Referring to FIGS. 10A to 10D, an activity impact identifier module 422 uses one or more UWB sensors to determine an intensity of one or more activities. In an example herein, consider that the entity/user is performing a yoga. In such a scenario, the activity impact identifier module 422 receives the pattern of UWB signals/reflected signal from the one or more objects 206a-206n and the user from the one or more UWB sensors. The activity impact identifier module 422 analyzes the properties of the received reflected signal such as, but are not limited to, the RSSI, the TDOA, the TOA, the AOA, and so on, to determine/monitor the intensity factors with respect to performing the yoga by the user, as depicted in FIG. 10A. In an example, the intensity factors may include at least one of, the vital parameters of the user, the intensity of the relative change in the position of the entities, the change in the ambience, and so on. The vital parameters of the user may include at least one of, the heartbeat and breathing rate of the user, or the like. Determining of the heartbeat of the user using the one or more UWB sensors is depicted in FIG. 10B. Determining the vital parameters of the user helps in obtaining information about the heartbeat and the breathing rate of the user, which allows knowledge of how much the user is involved in the particular activity (for example herein, performing the yoga) and accordingly to operate the associated IoT devices 204a-204n. Determining the relative change in the position of the user while involved in performing the activity is depicted in FIG. 10C. As depicted in FIG. 10C, continuously monitoring the movement pattern of the user involved in the activity using the one or more UWB sensors may be used to determine the intensity of the relative change in the position of the user. Thus, the intensity of the activity may be determined.

Determining the impact on the ambience using the one or more UWB sensors is depicted in FIG. 10D. As depicted in FIG. 10D, the impact on the ambience/any change in the ambience due to the ongoing activity of the user may be determined by tracking the change in the position of the one or more objects 206a-206n along with the change in the vital parameters of the user using the one or more UWB sensors.

On determining the intensity factors for each activity, the activity impact identifier module 422 determines the intensity of the activity being performed by the user.

Figure 11:
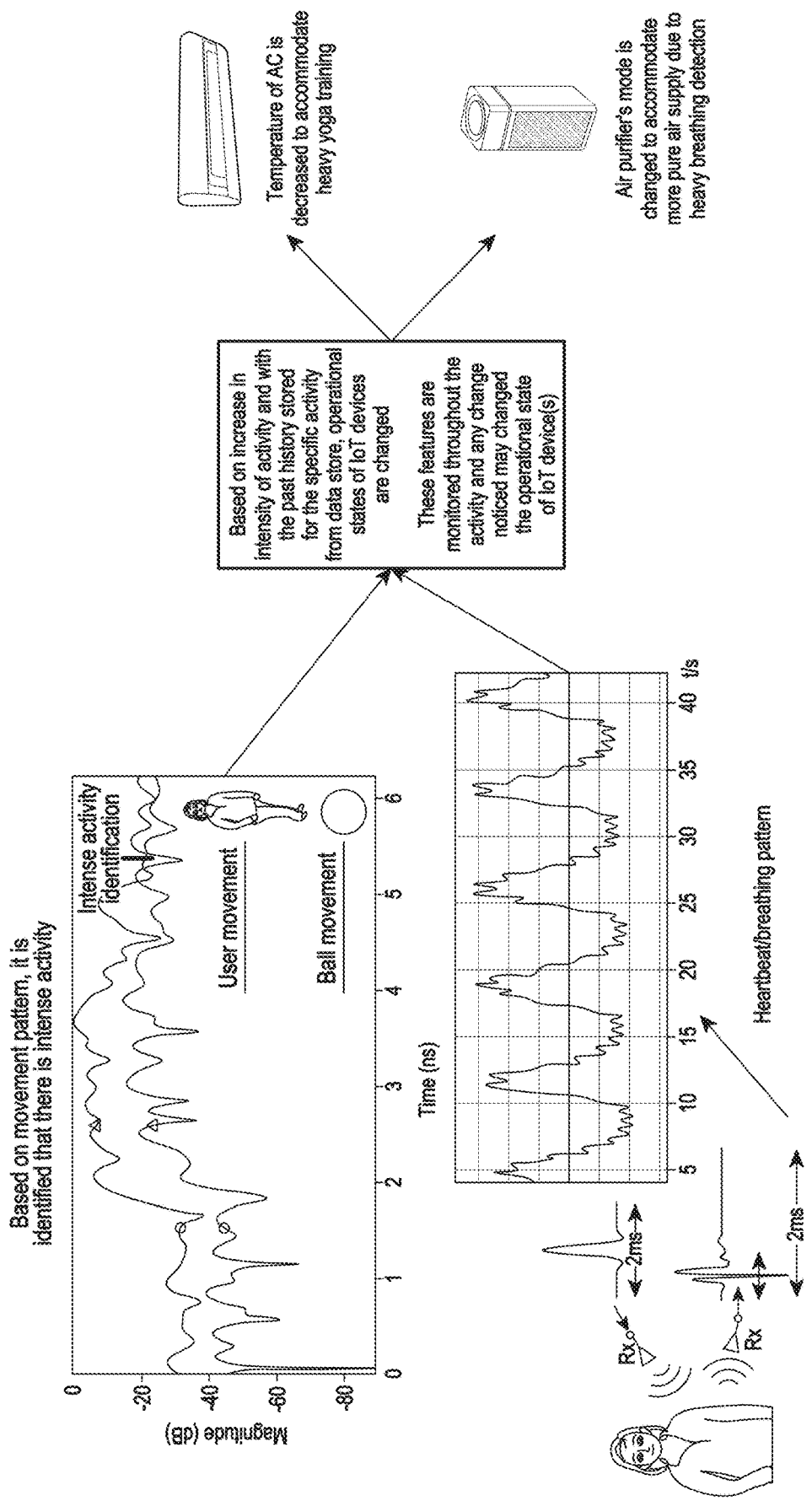
FIG. 11 is an example diagram depicting tuning of an operational state of the IoT devices based on the intensity of the activities, according to an embodiment of the disclosure.

FIG. 11 is an example diagram depicting tuning of an operational state of the IoT devices based on the intensity of the activities, according to an embodiment of the disclosure.

The IoT activity handling module 424 may be configured to tune the operational state of the one or more IoT devices 204a-204n associated with the one or more activities, based on the intensity of the one or more activities. The IoT activity handling module 424 is described in detail in conjunction with FIG. 11.

Referring to FIG. 11, consider an example scenario, an IoT activity handling module 424 receives an intensity of an activity being performed by a user (i.e., performing yoga by the user). The intensity of the activity may be determined based on the vital parameters of the user, the intensity of the relative change in the position of the entity, and the impact on the ambience. In such a scenario, based on the intensity of the activity and the past history stored for the specific activity from the activity device mapping database 316, the IoT activity handling module 424 tunes the operational state of the one or more IoT devices 204a-204n associated with the activity. In an example herein, as depicted in FIG. 11, the IoT activity handling module 424 decreases a temperature of the AC to accommodate heavy yoga training and changes a mode of the air purifier to accommodate more pure air supply due to heavy breathing detection.

FIGS. 3, and 4 show blocks of the electronic device 208, but it is to be understood that other embodiments are not limited thereon. In other embodiments, the electronic device 208 may include a greater or lesser number of blocks. Further, the labels or names of the blocks are used only for illustrative purpose and does not limit the scope of the embodiments herein. One or more blocks can be combined together to perform same or substantially similar function in the electronic device 208.

Figure 12A:
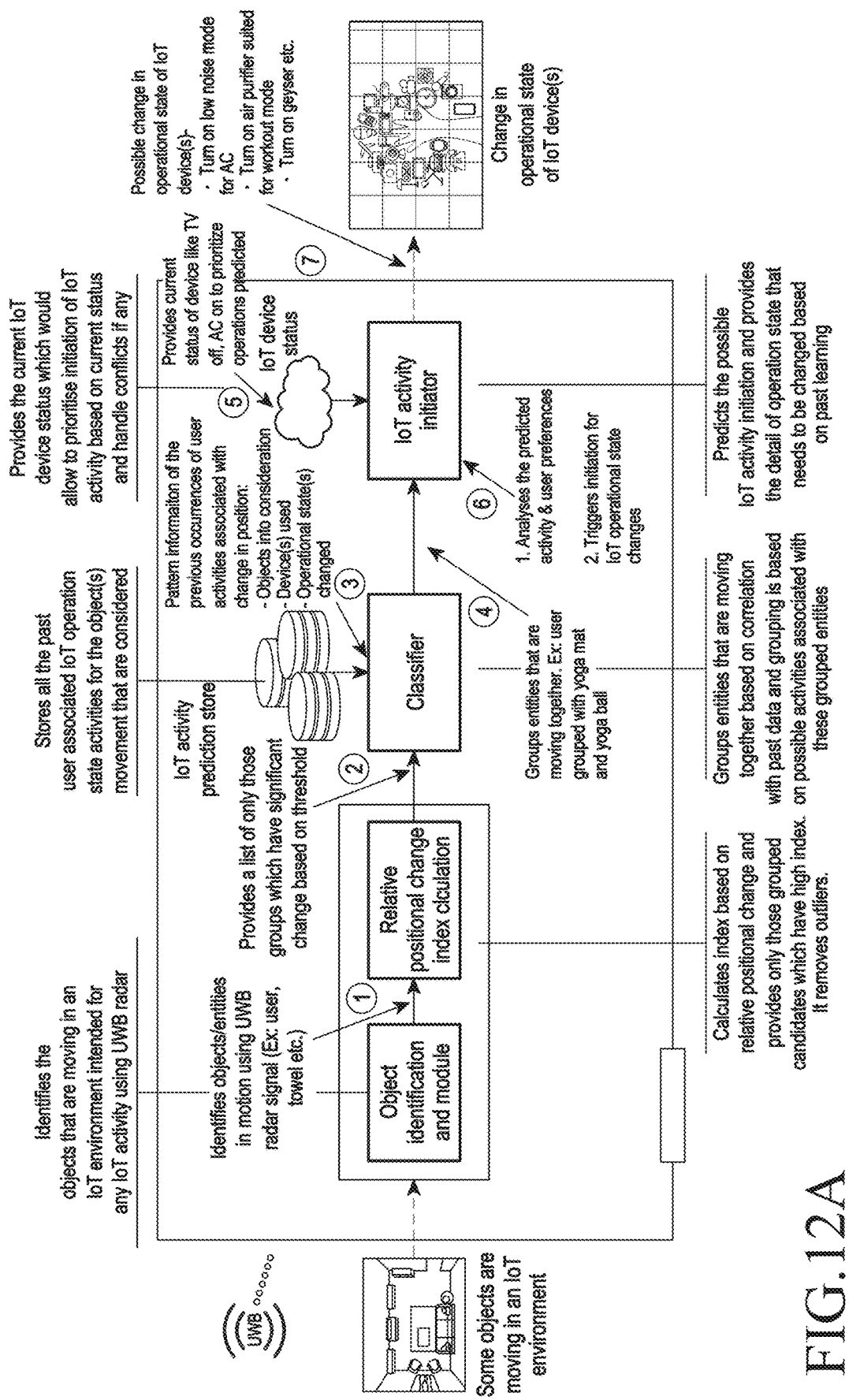
FIGS. 12A and 12B are example conceptual diagrams depicting controlling of the operational state of the one or more IoT devices, according to various embodiments of the disclosure.
Figure 12B:
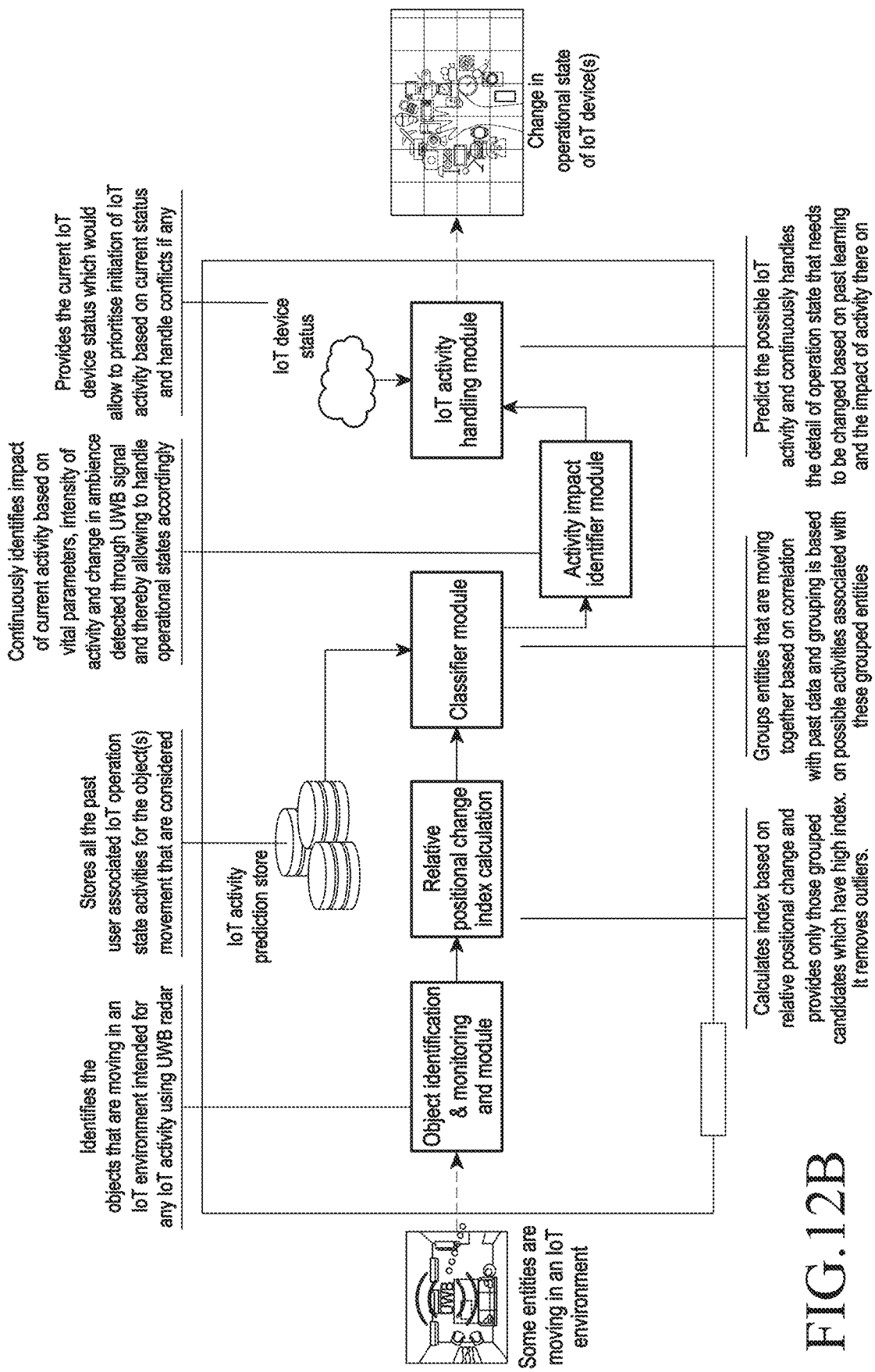

FIGS. 12A and 12B are example conceptual diagrams depicting controlling of an operational state of one or more IoT devices, according to various embodiments of the disclosure. Embodiments herein enable the electronic device 208 to operate/control the IoT devices 204a-204n based on the change in the relative position of the one or more objects 206a-206n with respect to the one or more entities.

Referring to FIG. 12A, for operating IoT devices 204a-204n, an electronic device 208 identifies one or more objects 206a-206n that are moving in an IoT environment from the first location to the second location along with the one or more entities using the one or more UWB sensors. In an example, the objects 206a-206n/entities may include a towel, a user, and so on.

On identifying the movement of the one or more objects 206a-206n, the electronic device 208 calculates the relative positional change index based on the position of the one or more objects 206a-206n at the first location/timestamp T1 and the second location/timestamp T2. The relative positional change index of the object (e.g., one of the one or more objects 206a-206n) indicates the probability for considering the corresponding object for the grouping. The electronic device 208 discards the one or more objects 206a-206n for grouping if the relative positional change index of the one or more objects 206a-206n is less than the threshold. The electronic device 208 considers the information about the objects 206a-206n whose relative positional change index is greater than the threshold for grouping.

The electronic device 208 groups the one or more objects 206a-206n and the one or more entities that are moving together into the same group by analyzing at least one of, the relative positional change index, the interaction of the one or more entities with the one or more objects 206a-206n, the past operation information state of the one or more entities, and so on, using the first neural network 402. For example, the electronic device 208 may group a user with a yoga mat and a yoga ball.

The electronic device 208 predicts the initiation of the one or more activities by the one or more entities in relation with the movement of the one or more objects 206a-206n. The electronic device 208 predicts the initiation of the one or more activities by analyzing at least one of, the detected interaction of the at least entity with the one or more objects 206a-206n, the parameters of the one or more entities, the past operation information state, and the grouping of the one or more objects 206a-206n, and so on.

On predicting the initiation of the one or more activities, the electronic device 208 detects the IoT devices 204a-204n for the predicted one or more activities. The electronic device 208 detects the IoT devices 204a-204n by analyzing at least one of, the predicted activity, the past operation information state of the entity, the grouping of one or more objects 206a-206n, the previous operational state changes with respect to the predicted activity, and so on, using the second neural network 404. The electronic device 208 identifies the current operational state of the detected IoT devices 204a-204n by communicating with the IoT cloud server 202. The electronic device 208 then generates the correlation of the predicted one or more activities with the one or more objects 206a-206n in the first location and the second location, the relative position of the one or more objects 206a-206n with respect to the one or more entities, and the current operational state of the one or more IoT devices 204a-204n. On generating the correlation, the electronic device 208 analyzes the generated correlation and the user preferences to modify the operational state of the IoT devices 204a-204n associated with the predicted one or more activities.

Referring to FIG. 12B, an electronic device 208 determines an intensity of one or more activities in which the one or more entities have been involved. The electronic device 208 determines the intensity of each activity by identifying the intensity factors of each activity using the one or more UWB sensors. The electronic device 208 tunes the operational state of the IoT devices 204a-204n associated with the one or more activities based on the determined intensity of the one or more activities.

Figure 13A:
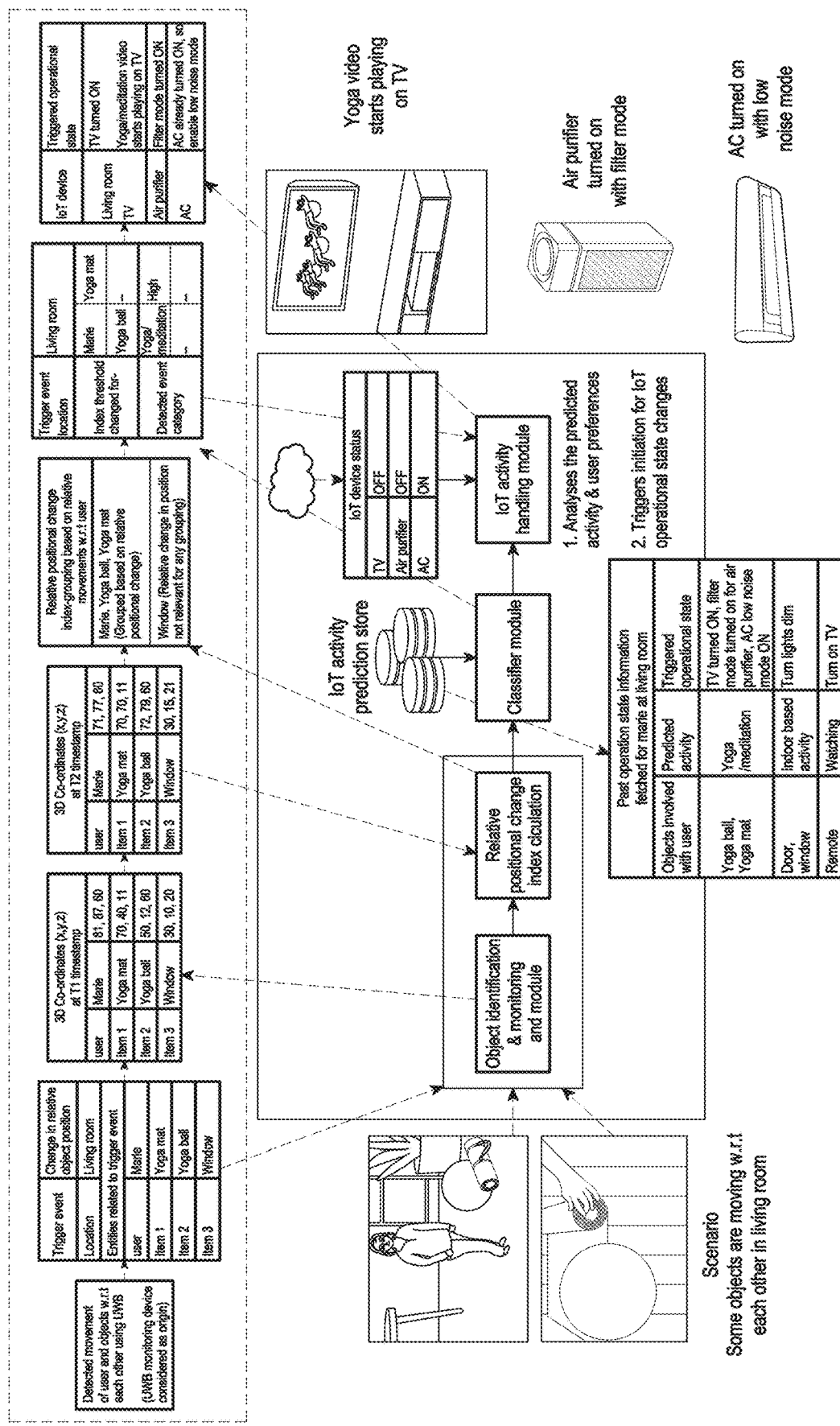
FIGS. 13A and 13B depict an example use case scenario of operating the IoT devices on predicting an initiation of a yoga activity by a user, according to various embodiments of the disclosure.
Figure 13B:
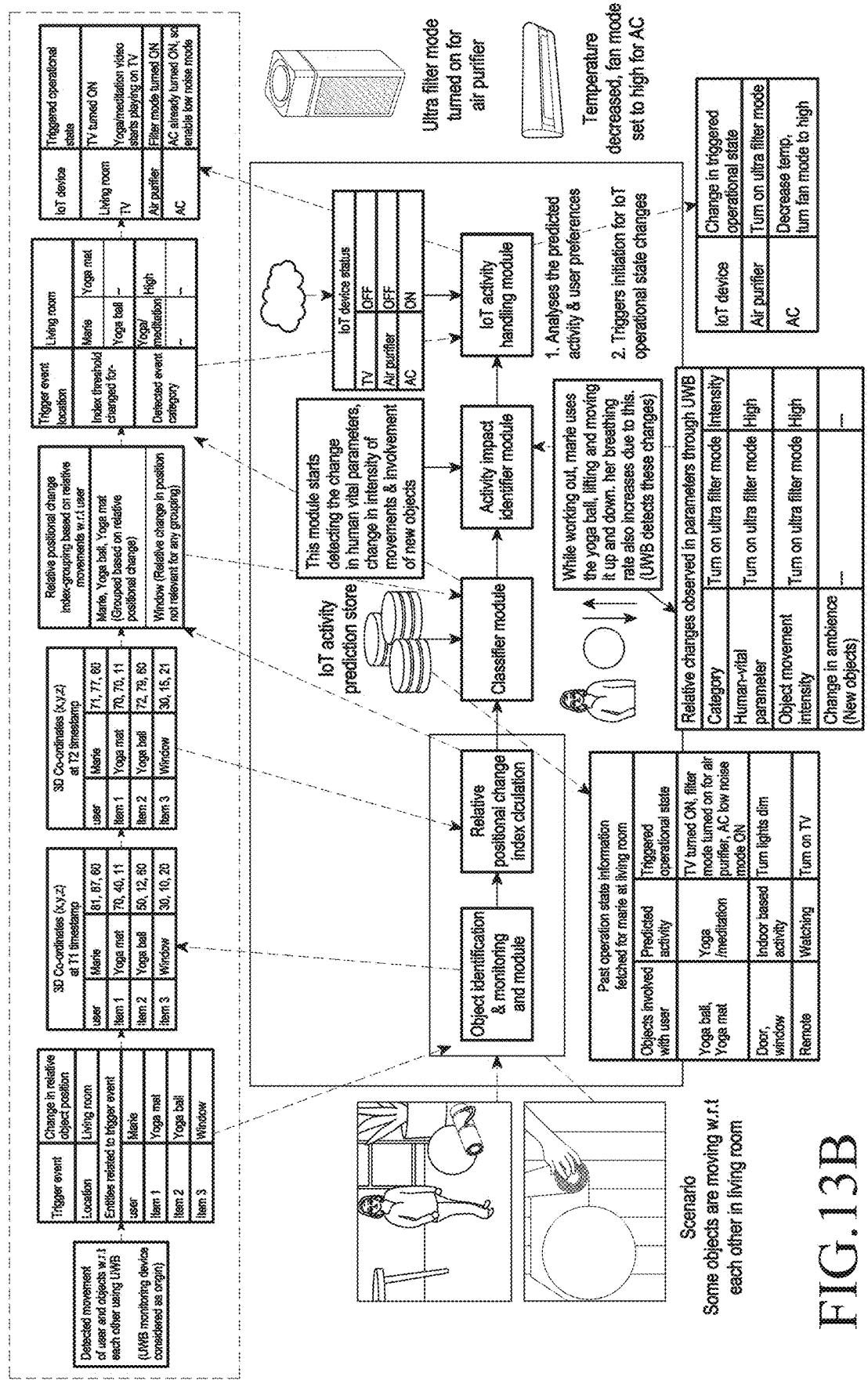

FIGS. 13A and 13B depict an example use case scenario of operating IoT devices on predicting the initiation of a yoga activity by a user, according to various embodiments of the disclosure.

Referring to FIG. 13A, consider an example scenario, wherein an electronic device 208 detects a movement of objects 206a-206n such as, a yoga ball, a yoga mat, and a window in a living room along with the user by identifying the change in the relative position/3D coordinates of the yoga ball, the yoga mat, and the window with respect to the user. The electronic device 208 calculates the relative positional change index for the yoga ball, the yoga mat, and the window by computing the position of the yoga ball, the yoga mat, and the window, respectively at the timestamp T1 and the timestamp T2.

The electronic device 208 groups the yoga ball, the yoga mat, and the user in the same group as, the yoga ball, the yoga mat, and the user are moving together. The electronic device 208 discards the window from the grouping, as the relative positional change index is lesser than the threshold (i.e., indicating the low probability). The electronic device 208 then analyzes at least one of, the interaction of the user with the yoga ball and the yoga mat, the past operation state information of the user, the grouping of the yoga ball, the yoga mat, and the user in the same group, the parameters of the user, or the like and predicts the initiation of the yoga activity by the user (i.e., an example of the activity).

On predicting the yoga activity, the electronic device 208 detects the IoT devices 204a-204n such as, a TV, an air purifier, and an AC as the associated devices for the yoga activity. The electronic device 208 analyzes at least one of, the predicted yoga activity, the past operation information state of the entity with respect to the yoga ball and the yoga mat, the grouping of the yoga ball, and the yoga mat along with the user, the previous operational state changes for the predicted yoga activity, or the like, using the second neural network 404 to detect the TV, the air purifier, and the AC as the IoT devices 204a-204n for the predicted yoga activity. The electronic device 208 collects the current operational state of the TV, the air purifier, and the AC from the IoT cloud server 202. The electronic device 208 generates the correlation of the yoga activity with the yoga ball and the yoga mat, the relative position of the yoga ball and the yoga mat with respect to the user, and the current operational state of the TV, the air purifier, and the AC. On generating the correlation, the electronic device 208 analyzes the generated correlation and the user preferences to modify the operational state of the TV, the air purifier, and the AC. In an example herein, the electronic device 208 turns ON the TV and plays a yoga/meditation video on the TV, turns ON a filter mode of the air purifier, and allows a low noise mode of the AC (as the AC has already turned ON).

Referring to FIG. 13B, once modifying an operational state of the TV, the air purifier, and the AC, an electronic device 208 monitors the intensity of the yoga activity being performed by the user using the one or more UWB sensors. In an example herein, the monitored intensity of the yoga activity indicates a high breathing rate of the user, and a high movement of the yoga ball. In such a scenario, based on the monitored intensity of the yoga activity, the electronic device 208 tunes the operational state of the air purifier, and the AC. In an example herein, the electronic device 208 turns ON an ultra-filter mode for the air purifier and decreases temperature and sets a fan mode of the AC to high.

Figure 14:
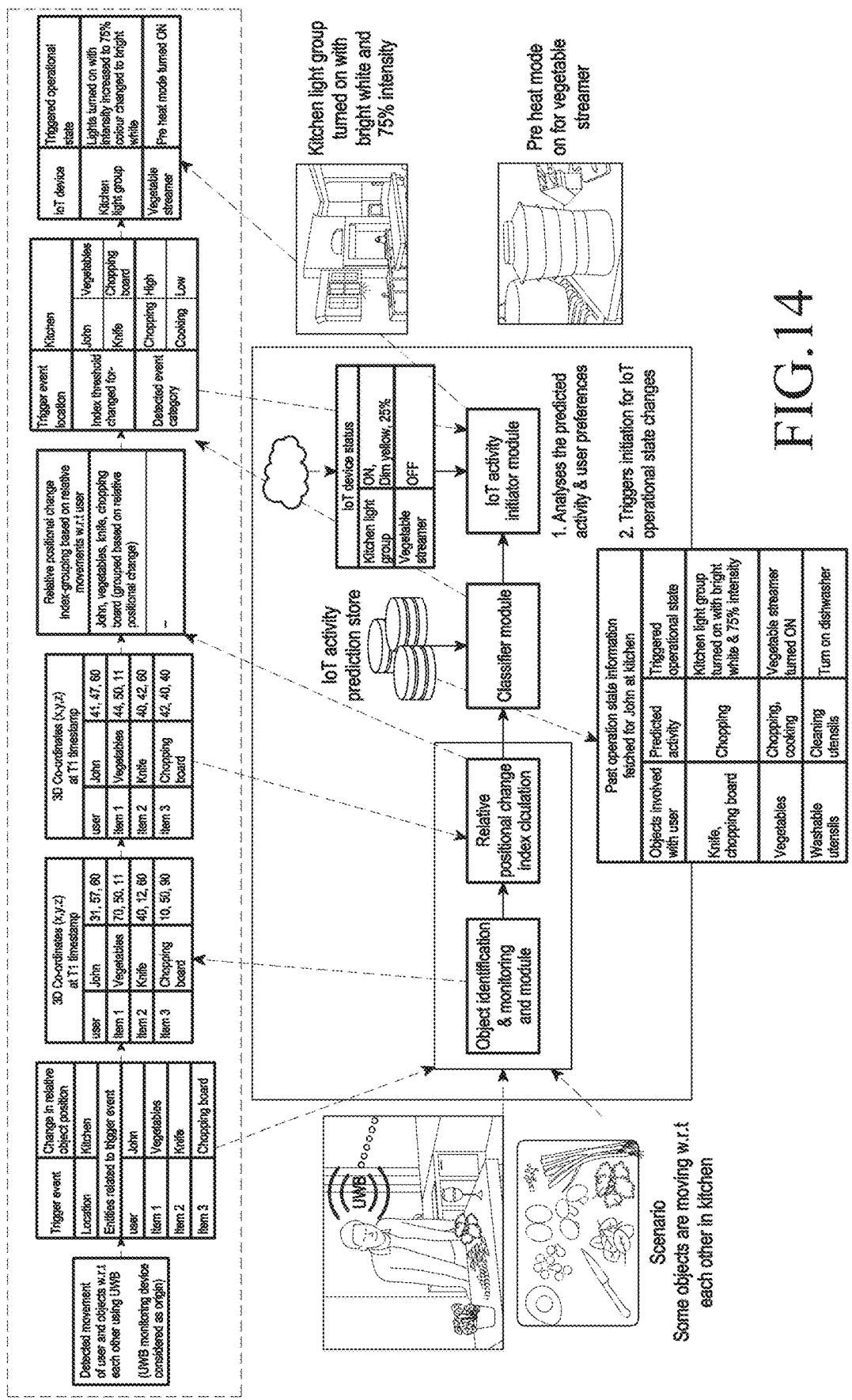
FIG. 14 depicts an example use case scenario of operating the IoT devices on predicting the initiation of a chopping activity by a user in a kitchen, according to an embodiment of the disclosure.

FIG. 14 depicts an example use case scenario of operating IoT devices on predicting the initiation of a chopping activity by a user in a kitchen, according to an embodiment of the disclosure.

Referring to FIG. 14, consider an example scenario, wherein an electronic device 208 detects a movement of objects 206a-206n such as, vegetables, a knife, and a chopping board along with the user in the kitchen by identifying the change in the relative position/3D coordinates of the vegetables, the knife, and the chopping table with respect to the user. The electronic device 208 calculates the relative positional change index for the vegetables, the knife, and the chopping table by computing the position of the vegetables, the knife, and the chopping table, respectively at the first timestamp T1 and the second timestamp T2.

The electronic device 208 groups the vegetables, the knife, the chopping table, and the user in the same group as, the vegetables, the knife, the chopping table, and the user are moving together. The electronic device 208 then analyzes at least one of, the interaction of the user with the vegetables, the knife, and the chopping table, the past operation state information of the user with respect to the vegetables, the knife, and the chopping table, the grouping of the vegetables, the knife, the chopping table and the user in the same group, the parameters of the user, or the like, and predicts the initiation of the chopping activity by the user to chop the vegetables.

On predicting the chopping activity, the electronic device 208 detects the IoT devices 204a-204n such as, a group of kitchen lights (referred hereinafter as a kitchen light group), and a vegetable steamer as the associated devices for the chopping activity. The electronic device 208 analyzes at least one of, the predicted activity, the past operation information state of the user with respect to the vegetables, the knife, and the chopping board, the grouping of the vegetables, the knife, the chopping table, and the user into the same group, the previous operational state changes with respect to the predicted chopping activity, and so on, using the second neural network 404 to detect the IoT devices 204a-204n for the predicted chopping activity. The electronic device 208 collects the current operational state of the kitchen light group and the vegetable steamer from the IoT cloud server 202. The electronic device 208 generates the correlation of the chopping activity with the vegetables, the knife, and the chopping board, the relative position of the vegetables, the knife, and the chopping board with respect to the user, and the current operational state of the kitchen light group and the vegetable steamer. On generating the correlation, the electronic device 208 analyzes the generated correlation and the user preferences to modify the operational state of the kitchen light group and the vegetable steamer. In an example herein, the electronic device 208 turns ON the kitchen light group with bright white and 75% intensity and turns ON a pre-heat mode for the vegetable steamer.

Figure 15A:
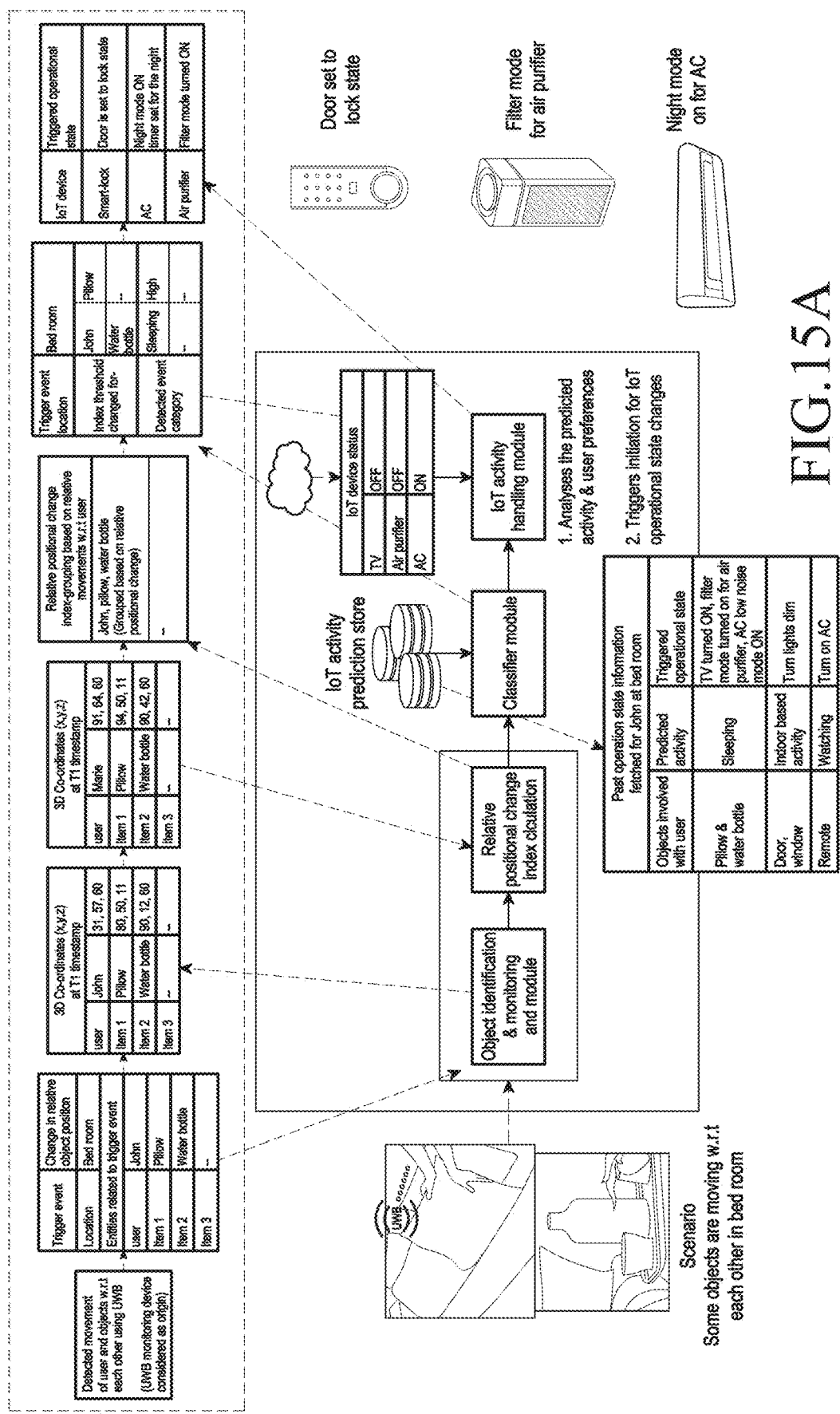
FIGS. 15A and 15B depict an example use case scenario of operating the IoT devices on predicting the initiation of a sleeping activity by a user in a bedroom, according to various embodiments of the disclosure.
Figure 15B:
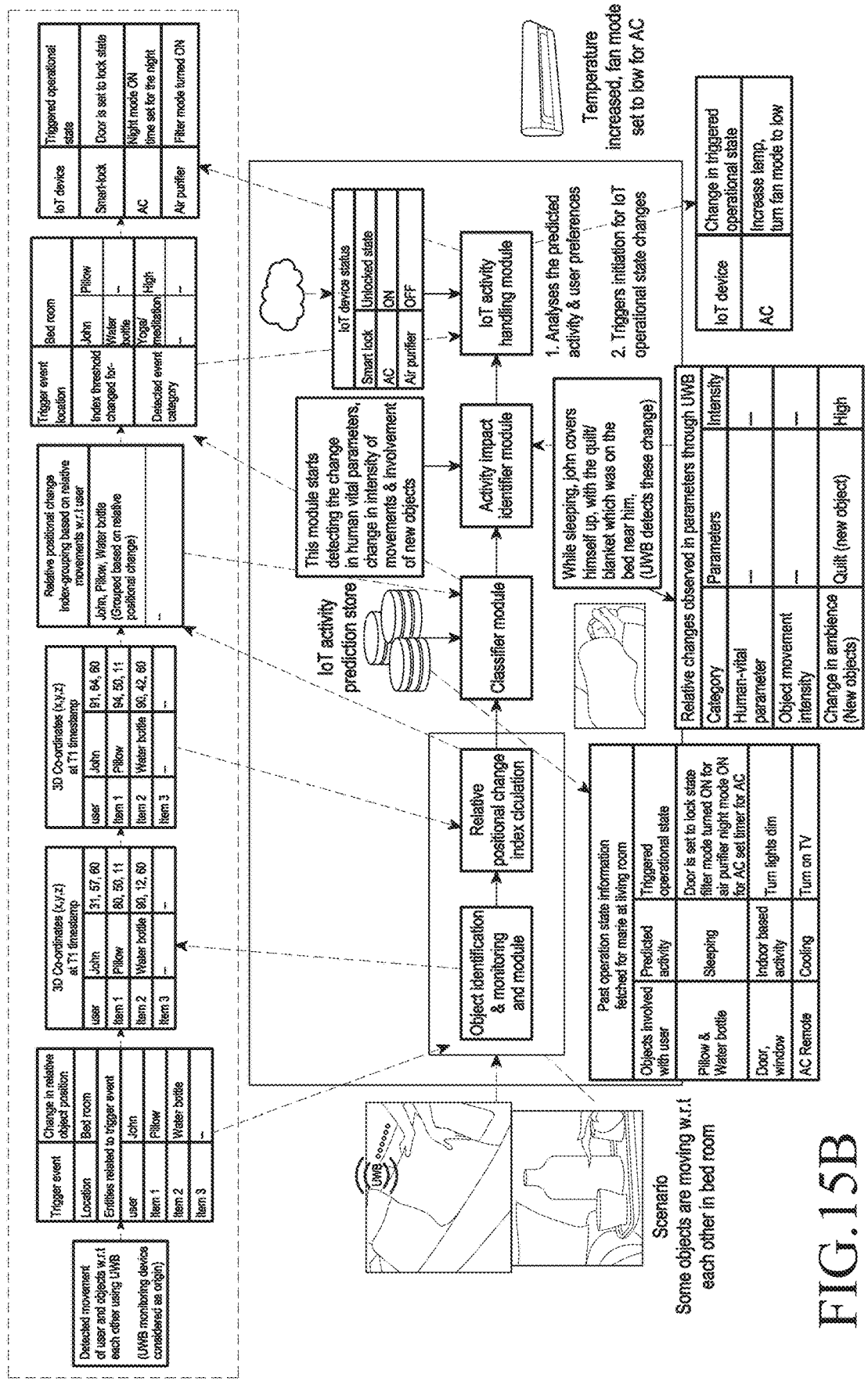

FIGS. 15A and 15B depict an example use case scenario of operating IoT devices on predicting the initiation of a sleeping activity by a user in a bedroom, according to various embodiments of the disclosure.

Referring to FIG. 15A, consider an example scenario, wherein an electronic device 208 detects a movement of objects 206a-206n such as, a pillow and a water bottle along with a user in the bedroom by identifying the change in the relative position/3D coordinates of the pillow and the water bottle with respect to the user. The electronic device 208 calculates the relative positional change index for the pillow and the water bottle by computing the position of the pillow and the water bottle, respectively at the timestamp T1 and the timestamp T2.

The electronic device 208 groups the pillow, the water bottle, and the user in the same group as, the pillow, the water bottle, and the user are moving together. The electronic device 208 then analyzes at least one of, the interaction of the user with the pillow and the water bottle, the past operation state information of the user with respect to the pillow and the water bottle, the grouping of the pillow, the water bottle, and the user in the same group, the parameters of the user, or the like, and predicts the initiation of sleeping activity by the user in the bedroom.

On predicting the sleeping activity, the electronic device 208 detects the IoT devices 204a-204n such as, a smart lock of a door, an AC, and an air purifier as the associated devices for sleeping activity. The electronic device 208 analyzes at least one of, the predicted sleeping activity, the past operation information state of the user with respect to the pillow and the water bottle, the grouping of the pillow, the water bottle, and the user into the same group, the previous operational state changes with respect to the predicted sleeping activity, and so on, using the second neural network 404 to detect the smart lock of the door, the AC, and the air purifier as the associated devices for the predicted sleeping activity. The electronic device 208 collects the current operational state of the smart lock of the door, the AC, and the air purifier from the IoT cloud server 202. The electronic device 208 generates the correlation of the sleeping activity with the pillow and the water bottle, the relative position of the pillow and the water bottle with respect to the user, and the current operational state of the smart lock of the door, the AC, and the air purifier. On generating the correlation, the electronic device 208 analyzes the generated correlation and the user preferences to modify the operational state of the smart lock of the door, the AC, and the air purifier. In an example herein, the electronic device 208 sets the smart lock of the door to a lock state, turns ON a filter mode for the air purifier, and turns a night mode for the AC.

Referring to FIG. 15B, once modifying the operational state of the smart lock, the air purifier, and the AC, an electronic device 208 monitors the intensity of the sleeping activity being performed by the user using the one or more UWB sensors. In an example herein, the monitored intensity of the sleeping activity indicates that the user has covered himself with a quilt/blanket, which was on a bed near the user. In such a scenario, based on the monitored intensity of the sleeping activity, the electronic device 208 tunes the operational state of the AC. In an example herein, the electronic device 208 increases temperature of the AC and sets a fan mode to low for the AC.

Figure 16A:
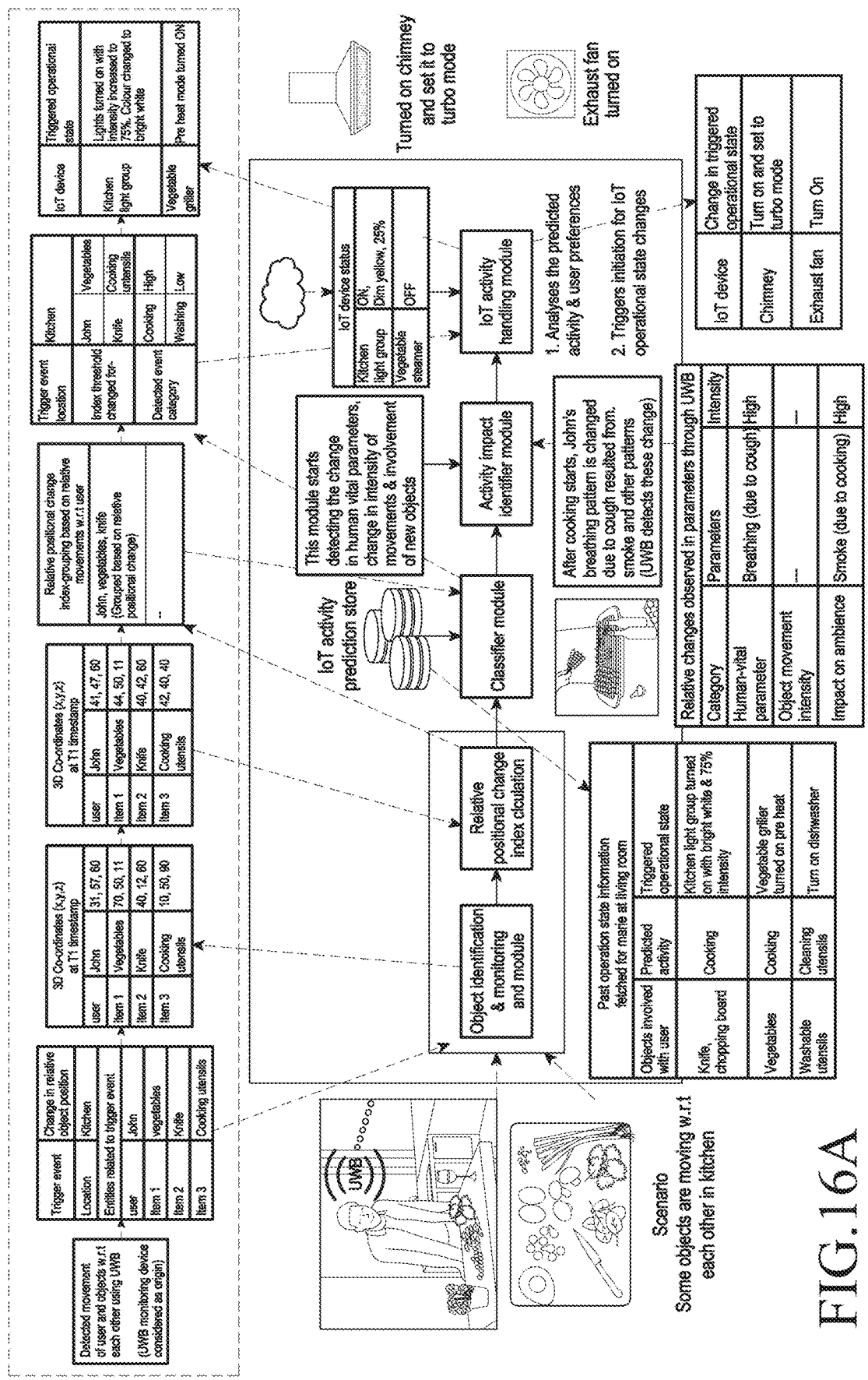
FIGS. 16A and 16B depict an example use case scenario of operating the IoT devices on predicting the initiation of a cooking activity by a user in a kitchen, according to various embodiments of the disclosure.
Figure 16B:
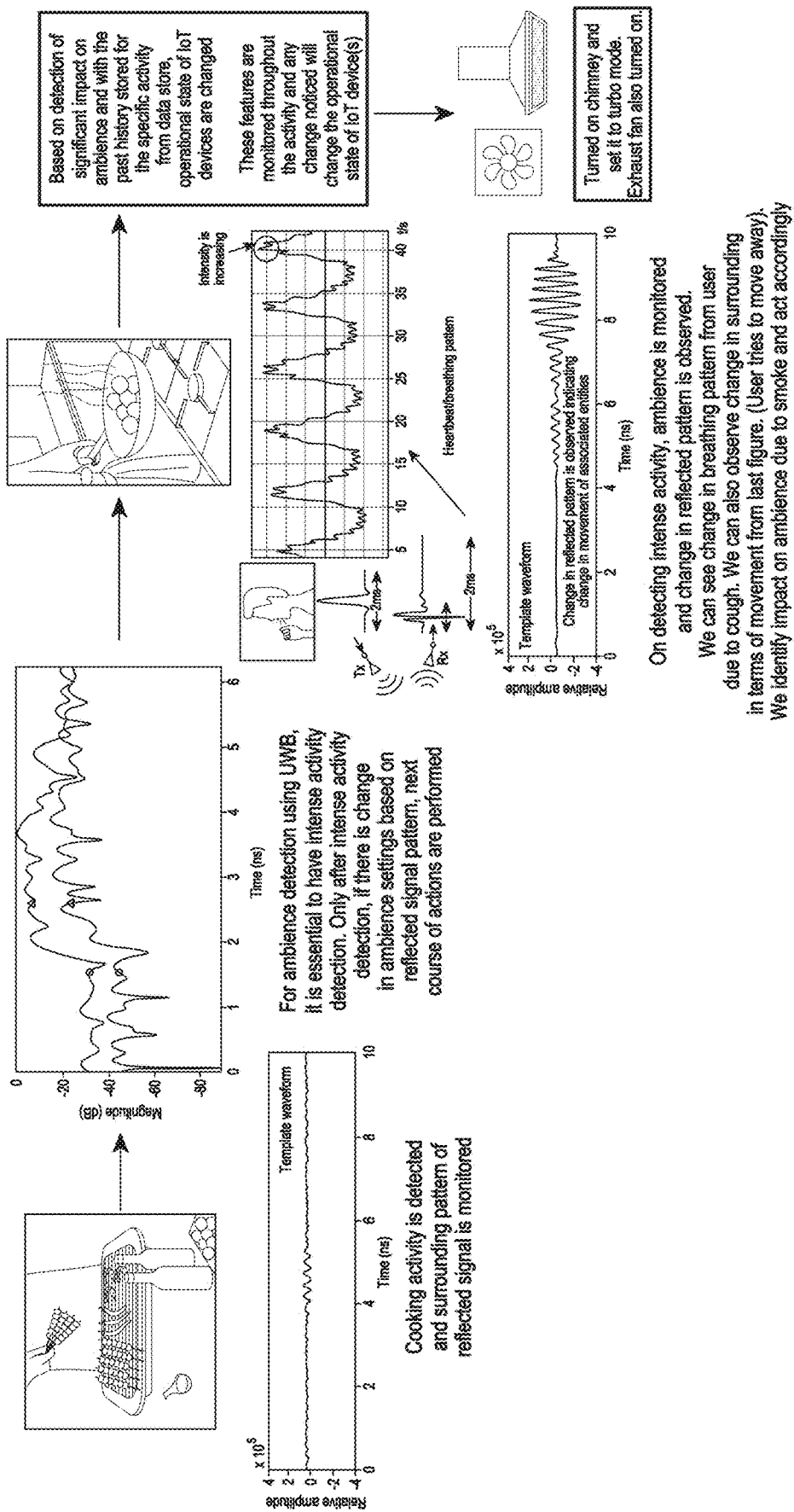

FIGS. 16A and 16B depict an example use case scenario of operating IoT devices on predicting the initiation of a cooking activity by a user in a kitchen, according to various embodiments of the disclosure.

Referring to FIG. 16A, consider an example scenario, wherein an electronic device 208 detects the movement of objects 206a-206n such as, vegetables, a knife, and cooking utensils along with the user in the kitchen, by identifying the change in the relative position/3D coordinates of the vegetables, the knife, and the cooking utensils with respect to the user. The electronic device 208 calculates the relative positional change index for the vegetables, the knife, and the cooking utensils by computing the position of the vegetables, the knife, and the cooking utensils, respectively at the first timestamp T1 and the second timestamp T2.

The electronic device 208 groups the vegetables, the knife, the cooking utensils, and the user in the same group as, the vegetables, the knife, the cooking utensils, and the user are moving together. The electronic device 208 then analyzes at least one of, the interaction of the user with the vegetables, the knife, and the cooking utensils, the past operation state information of the user with respect to the vegetables, the knife, and the cooking utensils, the grouping of the vegetables, the knife, the cooking utensils and the user in the same group, the parameters of the user, or the like and predicts the initiation of the cooking activity by the user in the kitchen.

On predicting the cooking activity, the electronic device 208 detects the IoT devices 204a-204n such as, a group of lights present in the kitchen (referred as a kitchen light group) and a vegetable steamer/griller, as the associated devices for the cooking activity. The electronic device 208 analyzes at least one of, the predicted activity, the past operation information state of the user with respect to the vegetables, the knife, and the cooking utensils, the grouping of the vegetables, the knife, and the cooking utensils into the same group, the previous operational state changes with respect to the predicted cooking activity, and so on, using the second neural network 404 to detect the kitchen light group and the vegetable steamer as the associated IoT devices 204a-204n for the predicted cooking activity. The electronic device 208 collects the current operational state of the kitchen light group and the vegetable steamer from the IoT cloud server 202. The electronic device 208 generates the correlation of the cooking activity with the vegetables, the knife, and the cooking utensils, the relative position of the vegetables, the knife, and the cooking utensils with respect to the user, and the current operational state of the kitchen light group and the vegetable steamer. On generating the correlation, the electronic device 208 analyzes the generated correlation and the user preferences to modify the operational state of the kitchen light group and the vegetable steamer. In an example herein, the electronic device 208 turns ON the kitchen light group with bright white and 75% intensity and turns ON a pre-heat mode for the vegetable steamer.

Referring to FIG. 16B, an electronic device 208 monitors the intensity of the cooking activity being performed by the user using the one or more UWB sensors. In an example herein, the intensity of the cooking activity indicates a change in a breathing pattern of the user due to cough, and a presence of smoke in the kitchen due to heating. In such a scenario, based on the monitored intensity of the cooking activity, the electronic device 208 turns ON a chimney and sets the chimney to a turbo mode, and turns ON an exhaust fan.

Figure 17A:
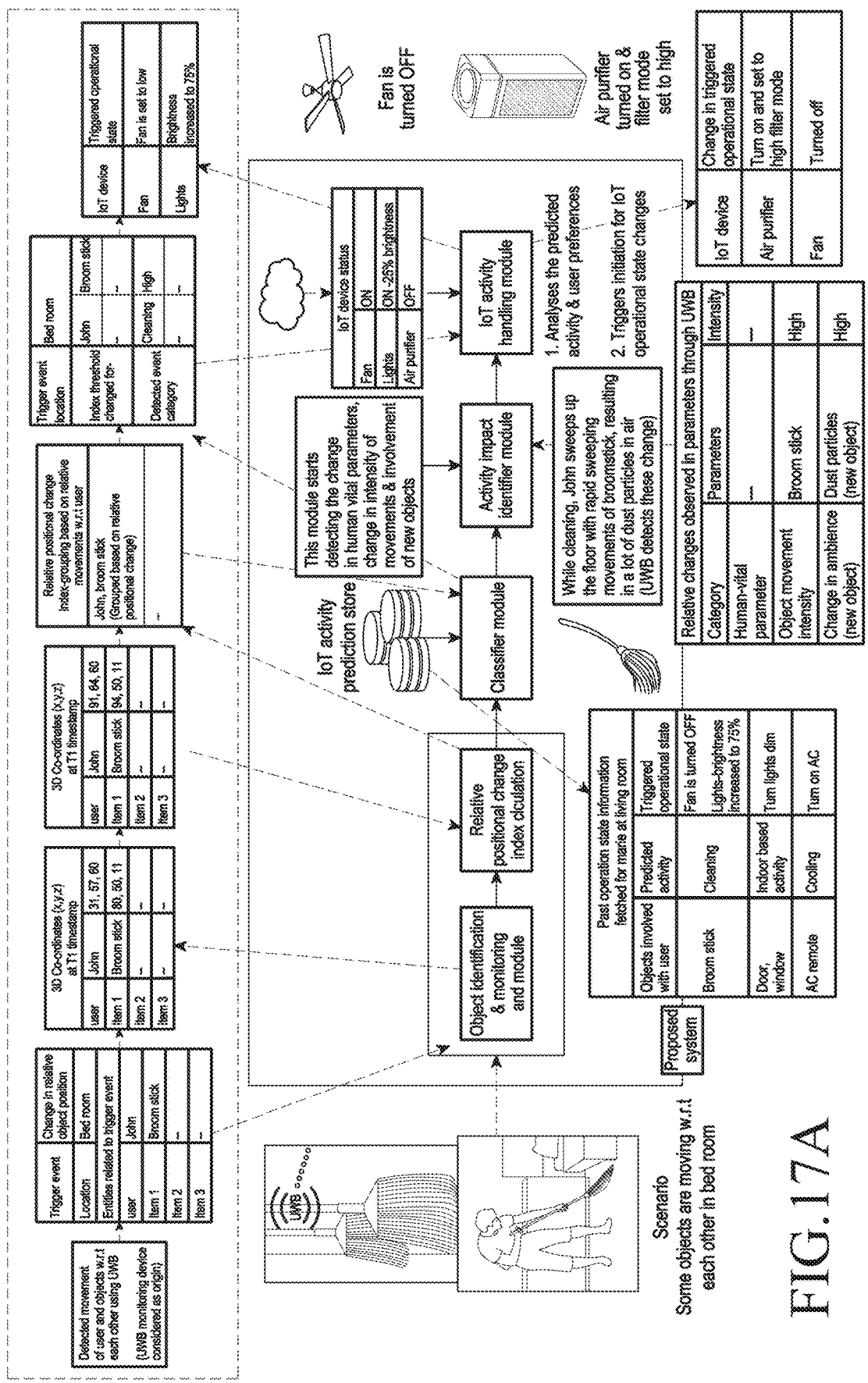
FIGS. 17A and 17B depict an example use case scenario of operating the IoT devices automatically on predicting the initiation of a cleaning activity by a user, according to various embodiments of the disclosure.
Figure 17B:
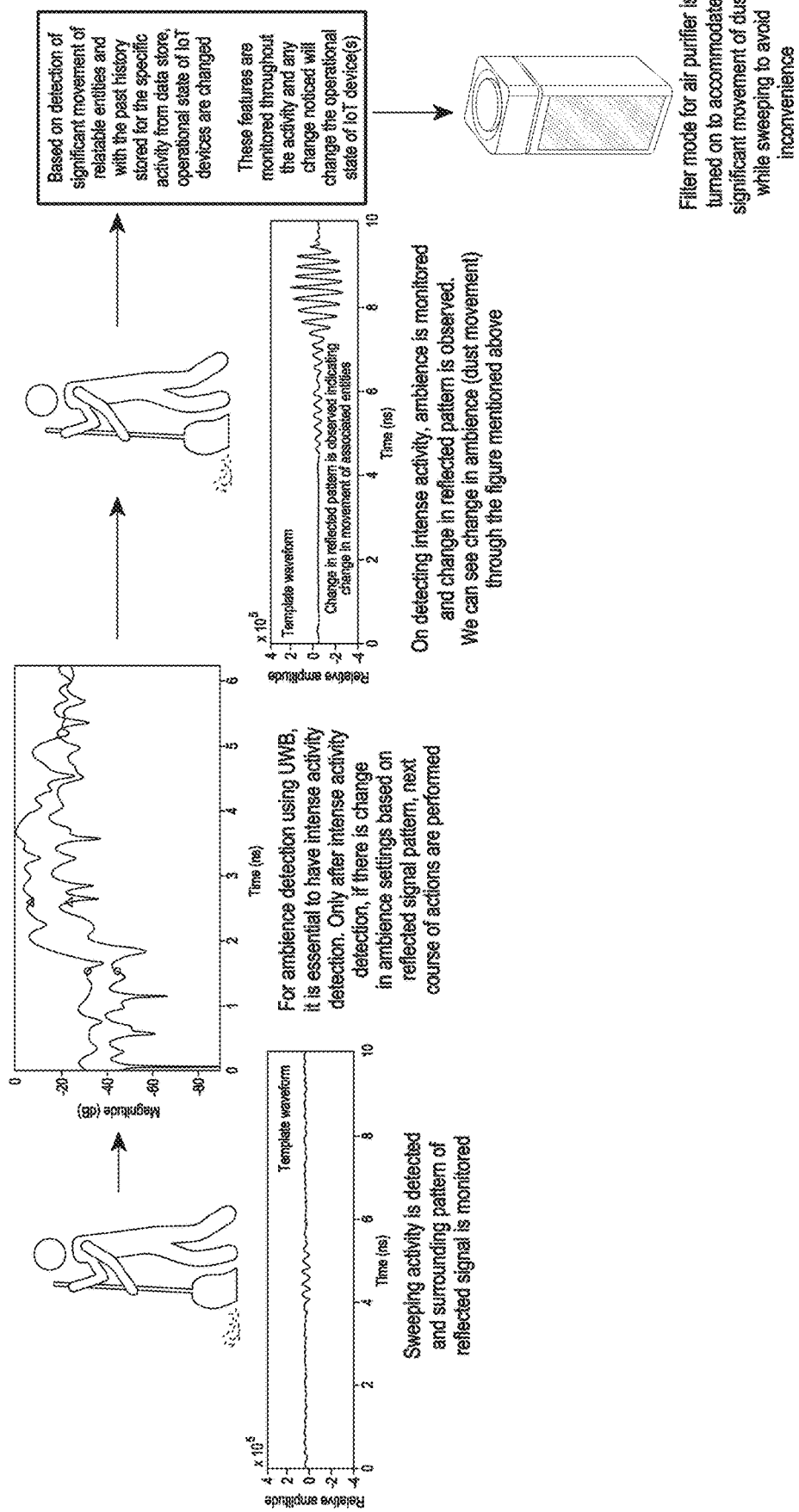

FIGS. 17A and 17B depict an example use case scenario of operating IoT devices automatically on predicting the initiation of a cleaning activity by a user, according to various embodiments of the disclosure.

Referring to FIG. 17A, consider an example scenario, wherein an electronic device 208 detects the movement of a broomstick along with the user in a bedroom by identifying the change in the relative position/3D coordinates of the broomstick with respect to the user. The electronic device 208 calculates the relative positional change index for the broomstick by computing the position of the broomstick at the timestamp T1 and the timestamp T2.

The electronic device 208 groups the broomstick and the user in the same group as, the broomstick and the user are moving together. The electronic device 208 then analyzes at least one of, the interaction of the user with the broomstick, the past operation state information of the user with respect to the broomstick, the grouping of the broomstick and the user in the same group, the parameters of the user, or the like and predicts the initiation of the cleaning activity by the user in the bedroom.

On predicting the cleaning activity, the electronic device 208 detects the IoT devices 204*a*-204*n* such as, a fan, lights, and an air purifier as the associated devices for the cleaning activity. The electronic device 208 analyzes at least one of, the predicted activity, the past operation information state of the user with respect to the broomstick, the grouping of the broomstick, and the user into the same group, the previous IoT devices 204*a*-204*n* and the associated operational state changes with respect to the predicted cleaning activity, and so on, using the second neural network 404 to detect the fan, the lights, and the air purifier as the associated devices for the initiated cleaning activity. The electronic device 208 collects the current operational state of the fan, the lights, and the air purifier for the cleaning activity. The electronic device 208 generates the correlation of the cleaning activity with the fan, the lights, and the air purifier, the relative position of the fan, the lights, and the air purifier with respect to the user, and the current operational state of the fan, the lights, and the air purifier. On generating the correlation, the electronic device 208 analyzes the generated correlation and the user preferences to modify the operational state of the fan, the lights, and the air purifier. In an example herein, the electronic device 208 sets a mode of operation of the fan to low and increases brightness of the lights by 75%.

Further, once modifying the operational state of the fan, the lights, and the air purifier, the electronic device 208 monitors the intensity of the cleaning activity being performed by the user using the one or more UWB sensors as depicted in FIG. 17B. In an example herein, the monitored intensity of the cleaning activity indicates rapid sweeping movements of the broomstick, which is resulting in a lot of dust particles in air. In such a scenario, based on the intensity of the cleaning activity, the electronic device 208 tunes the operational state of the fan and the air purifier. In an example herein, the electronic device 208 turns OFF the fan and turns ON the air purifier and sets a filter mode to high.

Figure 18:
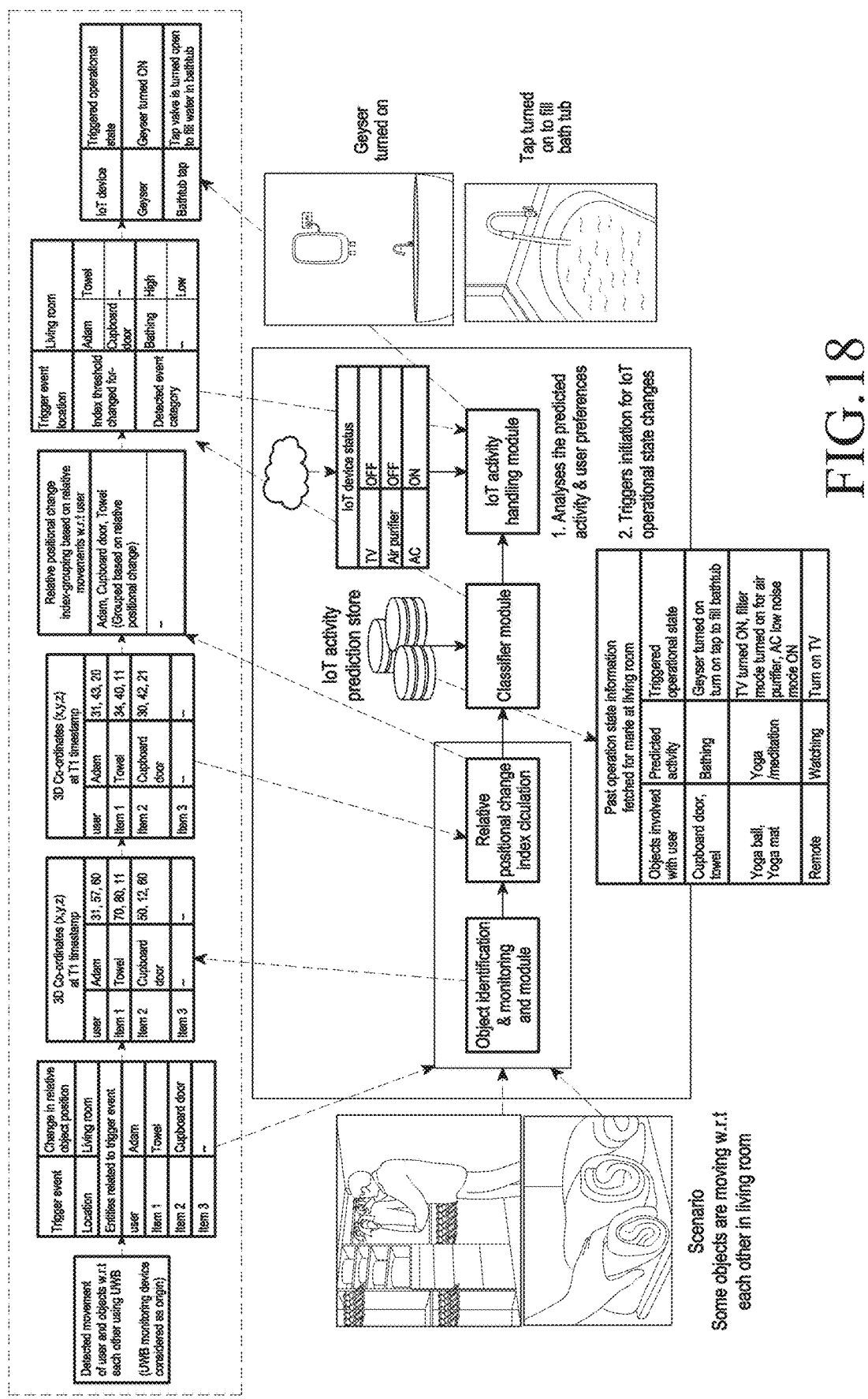
FIG. 18 depicts an example use case scenario of operating the IoT devices automatically on predicting the initiation of a bathing activity by a user, according to an embodiment of the disclosure.

FIG. 18 depicts an example use case scenario of operating IoT devices automatically on predicting the initiation of a bathing activity by a user, according to an embodiment of the disclosure.

Referring to FIG. 18, consider an example scenario, wherein an electronic device 208 detects movement of objects 206*a*-206*n* such as, a towel and a cupboard door along with the user in the bedroom by identifying the change in the relative position/3D coordinates of the towel and the cupboard with respect to the user. The electronic device 208 calculates the relative positional change index for the towel and the cupboard by computing the position of the towel and the cupboard, respectively at the timestamp T1 and the timestamp T2.

The electronic device 208 groups the towel, the cupboard, and the user in the same group as, the towel, the cupboard and the user are moving together. The electronic device 208 then analyzes at least one of, the interaction of the user with the towel and the cupboard, the past operation state information of the user with respect to the towel and the cupboard, the grouping of the towel, the cupboard, and the user in the same group, the parameters of the user, or the like and predicts the initiation of the bathing activity by the user.

On predicting the bathing activity, the electronic device 208 detects the IoT devices 204*a*-204*n* such as, a geyser, and a bathtub tap as the associated devices for the bathing activity. The electronic device 208 analyzes at least one of, the predicted activity, the past operation information state of the user with respect to the towel and the cupboard door, the grouping of the towel, the cupboard door, and the user into the same group, the previous operational state changes for the predicted bathing activity, and so on, using the second neural network 404 to detect the geyser and the bathtub tap as the associated devices for the predicted bathing activity. The electronic device 208 collects the current operational state of the geyser and the bathtub tap as the associated devices for the predicted bathing activity. The electronic device 208 generates the correlation of the bathing activity with the towel and the cupboard door, the relative position of the towel and the cupboard door with respect to the user, and the current operational state of the geyser and the bathtub tap. On generating the correlation, the electronic device 208 analyzes the generated correlation and the user preferences to modify the operational state of the geyser and the bathtub tap. In an example herein, the electronic device 208 turns ON the geyser and turns ON the bathtub tap to fill a bathtub.

Figure 19:
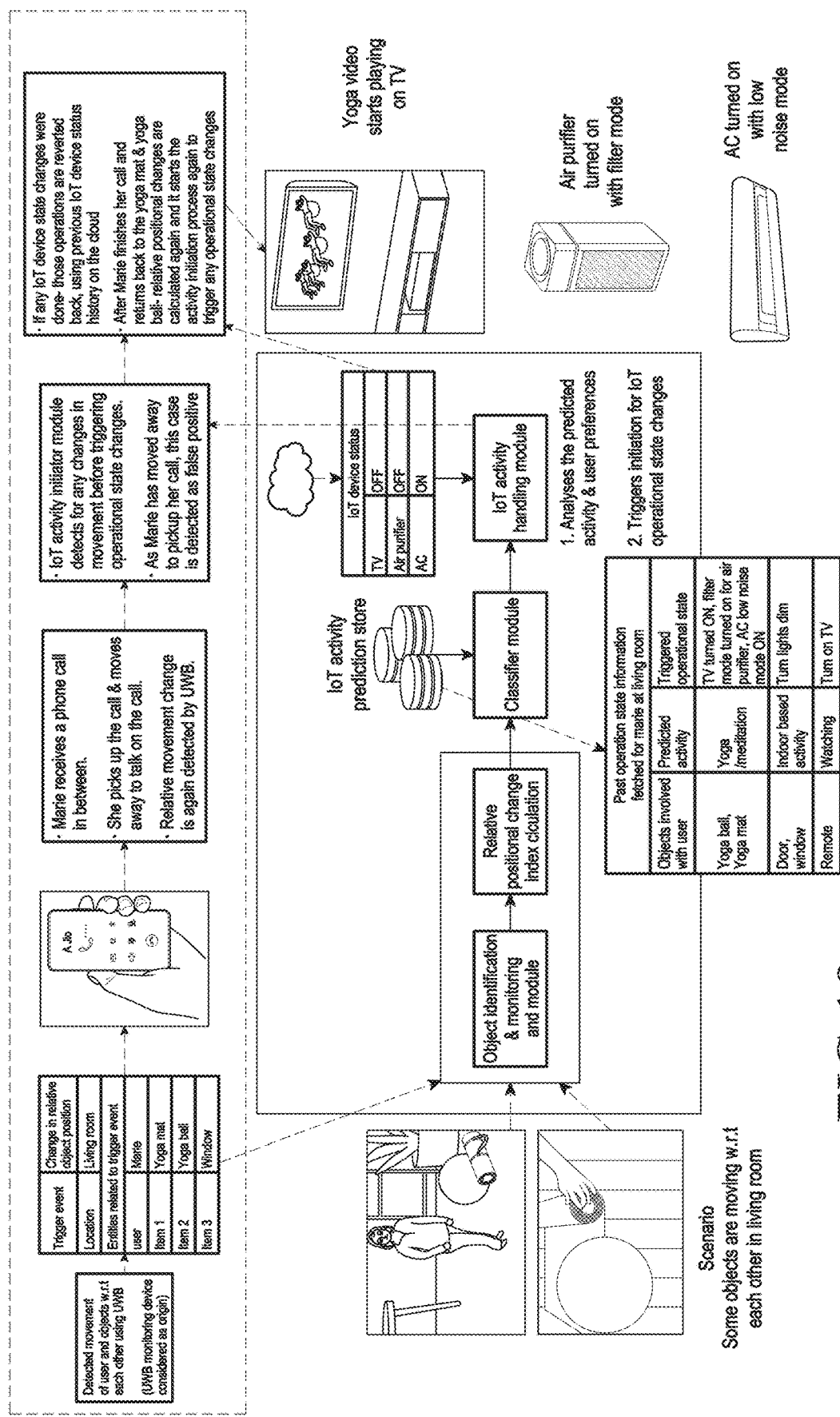
FIG. 19 depicts an example use case scenario of operating the IoT devices based on a false prediction of a yoga activity by a user, according to an embodiment of the disclosure.

FIG. 19 depicts an example use case scenario of operating the IoT devices based on a false prediction of a yoga activity by a user, according to an embodiment of the disclosure.

Referring to FIG. 19, consider an example scenario, wherein an electronic device 208 detects a movement of objects 206*a*-206*n* such as, a yoga ball, a yoga mat, and a window along with the user in a living room by identifying the change in the relative position/3D coordinates of the yoga ball, the yoga mat, and the window with respect to the user. The electronic device 208 calculates the relative positional change index for the yoga ball, the yoga mat, and the window by computing the position of the yoga ball, the yoga mat, and the window, respectively at the first timestamp T1 and the second timestamp T2.

The electronic device 208 groups the yoga ball, the yoga mat, and the user in the same group as, the yoga ball, the yoga mat, and the user are moving together. The electronic device 208 discards the window from the grouping, as the relative positional change index is lesser than the threshold (i.e., indicating the low probability). The electronic device 208 then analyzes at least one of, the interaction of the user with the yoga ball and the yoga mat, the past operation state information of the user, the grouping of the yoga ball, the yoga mat, and the user in the same group, the parameters of the user, or the like and predicts the initiation of the yoga activity by the user.

On predicting the yoga activity, the electronic device 208 detects the IoT devices 204a-204n such as, a TV, an air purifier, and an AC as the associated devices for the yoga activity. The electronic device 208 analyzes at least one of, the predicted activity, the past operation information state of the entity, the grouping of one or more objects 206a-206n, the operational state changes of the IoT devices 204a-204n with respect to the predicted activity, and so on, using the second neural network 404 to detect the TV, the air purifier, and the AC as the IoT devices 204a-204n for the yoga activity. The electronic device 208 collects the current operational state of the TV, the air purifier, and the AC from the IoT cloud server 202. The electronic device 208 generates the correlation of the yoga activity with the yoga ball and the yoga mat, the relative position of the yoga ball and the yoga mat with respect to the user, and the current operational state of the TV, the air purifier, and the AC. On generating the correlation, the electronic device 208 analyzes the generated correlation and the user preferences to modify the operational state of the TV, the air purifier, and the AC.

On modifying the operational state of the TV, the air purifier, and the AC, the electronic device 208 detects that the user has moved away from the yoga ball and the yoga mat to receive a phone call. In such a scenario, the electronic device 208 detects that the predicted activity/yoga activity as a false positive and reverts the operational state of the TV, the air purifier, and the AC to the previous operational state.

When the user finishes the call and returns to the yoga mat and the yoga ball, the electronic device 208 performs the above described operations to modify the operational state of the TV, the air purifier, and the AC based on the change in the relative position of the yoga mat and the yoga ball.

Figure 20:
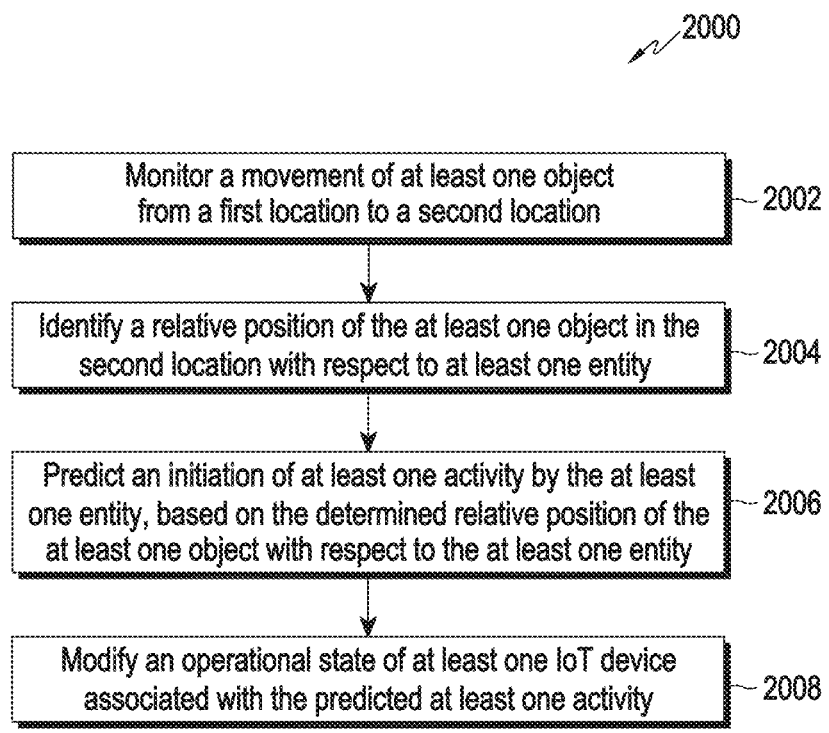
FIG. 20 is a flow chart depicting a method for operating the IoT devices, according to an embodiment of the disclosure.

FIG. 20 is a flow chart depicting a method for operating IoT devices, according to an embodiment of the disclosure.

Referring to FIG. 20 depicting a flow chart 2000, at operation 2002, the method includes monitoring, by an electronic device 208, a movement of the one or more objects 206a-206b from the first location to the second location. At operation 2004, the method includes identifying, by the electronic device 208, the relative position of the one or more objects 206a-206n in the second location with respect to at least one entity.

At operation 2006, the method includes predicting, by the electronic device 208, the initiation of the one or more activities by the one or more entities, based on the determined relative position of the one or more objects 206a-206n with respect to the one or more entities. At operation 2008, the method includes modifying, by the electronic device 208, the operational state of the one or more IoT devices 204a-204n associated with the predicted one or more activities.

Embodiments herein modify operational state of Internet of Things (IoT) devices automatically based on an initiation of one or more activities by a user/entity through a relative change in position of objects in an IoT environment detected by a UWB sensor, which may ease user's long manual intervention in operating the related IoT devices.

Embodiments herein provide an automated real time quick action to a user based on the relative change in position of objects, which may be user friendly and help the user to modify the operational state of the IoT devices.

Embodiments herein improve connected user experience in a smart home environment with all the objects.

Embodiments herein provide an integrated IoT experience with non-IoT entities.

Embodiments herein increase customer lifetime value by easing out few operations in the IoT environment.

The embodiments disclosed herein can be implemented through at least one software program running on at least one hardware device and performing network management functions to control the elements. The elements shown in FIGS. 2, 3, and 4 can be at least one of a hardware device, or a combination of hardware device and software module.

The embodiments disclosed herein describe methods and systems for operating devices in an IoT environment. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in, e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which could be, e.g., hardware means such as, e.g., an application-specific integrated circuit (ASIC), or a combination of hardware and software means, e.g., an ASIC and a field programmable gate array (FPGA), or at least one microprocessor and at least one memory with software modules located therein. The method embodiments described herein could be implemented partly in hardware and partly in software. Alternatively, the disclosure may be implemented on different hardware devices, e.g., by using a plurality of CPUs.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating devices by an electronic device in an Inter of Things (IoT) environment, the method comprising:
   monitoring a movement of at least one object from a first location to a second location;
   identifying a relative position of the at least one object in the second location with respect to at least one entity;
   predicting an initiation of at least one activity by the at least one entity, based on the identified relative position of the at least one object with respect to the at least one entity; and
   modifying an operational state of at least one device associated with the predicted at least one activity,
   wherein the predicting of the initiation of the at least one activity by the at least one entity comprises:
   analyzing at least one of interaction of the at least entity with the at least one object which is detected by using a pattern of Ultra-wideband (UWB) signals received from at least one UWB sensor, parameters of the at least one entity which is derived using the at least one UWB sensor, a past operation information state for the at least one entity with respect to the at least one object, or grouping of the at least one object based on the relative position of the at least one object and the detected interaction of the at least one entity with the at least one object, to predict the initiation of the at least one activity in relation to the identified relative position of the at least one object with respect to the at least one entity.

2. The method of claim 1, further comprising:
determining an intensity of the at least one activity; and
tuning the operational state of the at least one device associated with the at least one activity based on the determined intensity of the at least one activity.

3. The method of claim 2, wherein the determining of the intensity of the at least one activity comprises:
monitoring at least one intensity factor by using at least one Ultra-wideband (UWB) sensor, wherein the at least one intensity factor includes at least one of vital parameters of the at least one entity involved in the at least one activity, a change in a relative position of the at least one entity involved in the at least one activity, or a change in an ambience due to the at least one activity; and
determining the intensity of the at least one activity by processing the monitored at least one intensity factor by using a third neural network.

4. The method of claim 1, wherein at least one Ultra-wideband (UWB) sensor is used to monitor the movement of the at least one object from the first location to the second location and to identify the relative position of the at least one object in the second location with respect to the at least one entity.

5. The method of claim 1, wherein the parameters of the at least one entity comprise at least one of an identity of the at least one entity, vital parameters of the at least one entity, a location of the at least one entity, or a timestamp depicting a time of interaction of the at least one entity with the at least one object.

6. The method of claim 1, wherein fetching of the past operation information state for the at least one entity includes:
creating an object-entity mapping pair, wherein the object-entity mapping pair comprises a mapping of the at least one object with the at least one entity interacting with the at least one object; and
fetching the past operation information state from an activity prediction database for the created object-entity mapping pair, wherein the past operation information state provides information about at least one previously monitored activity, an operational state of the at least one device, and parameters of the at least one entity for each of a plurality of object-entity mapping pairs.

7. The method of claim 1, wherein the grouping of the at least one object comprises:
computing a relative positional change index for the at least one object based on the identified relative position of the at least one object in the second location with respect to the at least one entity, wherein the relative positional change index of the at least one object indicates a probability for considering the at least one object for grouping; and
analyzing at least one of the relative positional change index, the interaction of the at least entity with the at least one object, or the past operation information state of the at least one entity, by using a first neural network to group the at least one object.

8. The method of claim 1, wherein the modifying of the operational state of the at least one device comprises:
detecting, by the electronic device, the at least one device for the predicted at least one activity by analyzing at least one of the predicted at least one activity, the past operation information state of the at least one entity, or previous operational state changes for the predicted at least one activity, by using a second neural network;
detecting, by the electronic device, a current operational state of the detected at least one device;
generating, by the electronic device, a correlation of the predicted at least one activity with the at least one object in the first location and the second location, the relative position of the at least one object with respect to the at least one entity, and the current operational state of the at least one device; and
modifying the operational state of the at least one device by analyzing at least one of the generated correlation, the current operational state of the at least one device, or user preferences.

9. The method of claim 8, further comprising:
reverting the operational state of the at least one device to a previous operational state by using a previous device status history, in response to detecting that the at least one entity moves away from the at least one object.

10. An electronic device for operating devices in an Internet of Things (IoT) environment, the electronic device comprising:
a memory storing program code; and
a processor coupled to the memory, wherein the program code, when executed by the processor, causes the electronic device to:
monitor a movement of at least one object from a first location to a second location,
identify a relative position of the at least one object in the second location with respect to at least one entity,
predict an initiation of at least one activity by the at least one entity, based on the identified relative position of the at least one object with respect to the at least one entity, and
modify an operational state of at least one device associated with the predicted at least one activity,
wherein for predicting the initiation of the at least one activity by the at least one entity, the program code, when executed by the processor, causes the electronic device to:
analyze at least one of interaction of the at least entity with the at least one object which is detected by using a pattern of Ultra-wideband (UWB) signals received from at least one UWB sensor, parameters of the at least one entity which is derived using the at least one UWB sensor, a past operation information state for the at least one entity with respect to the at least one object, or grouping of the at least one object based on the relative position of the at least one object and the detected interaction of the at least one entity with the at least one object, to predict the initiation of the at least one activity in relation to the identified relative position of the at least one object with respect to the at least one entity.

11. The electronic device of claim 10, wherein the program code, when executed by the processor, causes the electronic device further to:
determine an intensity of the at least one activity, and
tune the operational state of the at least one device associated with the at least one activity based on the determined intensity of the at least one activity.

12. The electronic device of claim 10, wherein at least one Ultra-wideband (UWB) sensor is used to monitor the movement of the at least one object from the first location to the second location and to identify the relative position of the at least one object in the second location with respect to the at least one entity.

13. The electronic device of claim 12, wherein the program code, when executed by the processor, causes the electronic device further to:
monitor at least one intensity factor by using the at least one UWB sensor, wherein the at least one intensity factor includes at least one of vital parameters of the at least one entity involved in the at least one activity, a change in a relative position of the at least one entity involved in the at least one activity, or a change in an ambience due to the at least one activity, and
determine the intensity of the at least one activity by processing the monitored at least one intensity factor by using a third neural network.

14. The electronic device of claim 10, wherein the parameters of the at least one entity comprise at least one of: an identity of the at least one entity, vital parameters of the at least one entity, a location of the at least one entity, or a timestamp depicting a time of interaction of the at least one entity with the at least one object.

15. The electronic device of claim 10, wherein the program code, when executed by the processor, causes the electronic device further to:
create an object-entity mapping pair, wherein the object-entity mapping pair includes a mapping of the at least one object with the at least one entity interacting with the at least one object, and
fetch the past operation information state from an activity prediction database for the created object-entity mapping pair, wherein the past operation information state provides information about at least one previously monitored activity, an operational state of the at least one device, and parameters of the at least one entity for each of a plurality of object-entity mapping pairs.

16. The electronic device of claim 10, wherein the program code, when executed by the processor, causes the electronic device further to:
compute a relative positional change index for the at least one object based on the identified relative position of the at least one object in the second location with respect to the at least one entity, wherein the relative positional change index of the at least one object indicates a probability for considering the at least one object for grouping, and
analyze at least one of the relative positional change index, the interaction of the at least entity with the at least one object, or the past operation information state of the at least one entity, by using a first neural network to group the at least one object.

17. The electronic device of claim 10, wherein the program code, when executed by the processor, causes the electronic device further to:
detect the at least one device for the predicted at least one activity by analyzing at least one of the predicted at least one activity, a past operation information state of the at least one entity, or previous operational state changes for the predicted at least one activity, by using a second neural network,
detect a current operational state of the detected at least one device,
generate a correlation of the predicted at least one activity with the at least one object in the first location and the second location, the relative position of the at least one object with respect to the at least one entity, and the current operational state of the at least one device, and
modify the operational state of the at least one device by analyzing at least one of the generated correlation, the current operational state of the at least one device, or user preferences.

18. The electronic device of claim 17, wherein the program code, when executed by the processor, causes the electronic device further to:
revert the operational state of the at least one device to a previous operational state by using a previous device status history, in response to detecting that the at least one entity moves away from the at least one object.

* * * * *